US006925468B1

(12) United States Patent
Bobbitt et al.

(10) Patent No.: US 6,925,468 B1
(45) Date of Patent: Aug. 2, 2005

(54) CONFIGURING SYSTEMS FOR GENERATING BUSINESS TRANSACTION REPORTS USING PROCESSING RELATIONSHIPS AMONG ENTITIES OF AN ORGANIZATION

(75) Inventors: Charles P. Bobbitt, Dallas, TX (US); Steven G. Doughty, Plano, TX (US)

(73) Assignee: Computer Sciences Corporation, Austin, TX (US)

( * ) Notice: Subject to any disclaimer, the term of this patent is extended or adjusted under 35 U.S.C. 154(b) by 454 days.

(21) Appl. No.: 09/699,054

(22) Filed: Oct. 27, 2000

Related U.S. Application Data

(60) Provisional application No. 60/162,411, filed on Oct. 29, 1999.

(51) Int. Cl.[7] .................. G06F 17/00; G06F 17/30; G06F 17/60
(52) U.S. Cl. ............................ 707/102; 705/35
(58) Field of Search ................... 707/1, 100–102, 707/104.1, 200, 6, 7, 103 Y, 10, 4, 3; 709/35, 36; 705/1–45

(56) References Cited

U.S. PATENT DOCUMENTS

| 4,878,167 A | 10/1989 | Kapulka et al. |
| 5,099,422 A | 3/1992 | Foresman et al. |
| 5,191,522 A | 3/1993 | Bosco et al. |

(Continued)

FOREIGN PATENT DOCUMENTS

| EP | 0 280 773 | 9/1988 |
| EP | 0 465 018 | 1/1992 |
| EP | 0 836 779 | 4/1998 |
| EP | 0 926 608 | 6/1999 |

OTHER PUBLICATIONS

"@ Fault A Commitment to Consistency," Computer Sciences Corporation, Copyright 2000, pp. 1–2.
Merlin, Jr., William F., "Colossus: What We Know Today," The Merlin Law Group, Aug. 2000, Tampa, FL, pp. 1–8.
Merlin, Jr., William F., "Collision Course With The Colossus Program: How To Deal With It," The Merlin Law Group, May 2000, Tampa, FL, pp. 1–17.
Merlin, Jr., William F., "Overcoming Allstate's Trade Secrets and Work–Product Objections," The Merlin Law Group, Mar. 2000, Tampa, FL, pp. 1–31.
Mead, Jay, Technical Communication, Aug. 1998, V. 45, N. 3, p. 353–380.
Scopus Introduces World's Most Complete Call Center Solution for Financial Services; PR Newswire dated Nov.5, 1997.

(Continued)

*Primary Examiner*—Safet Metjahic
*Assistant Examiner*—Marc Filipczyk
(74) *Attorney, Agent, or Firm*—Meyertons, Hood, Kivlin, Kowert & Goetzel, P.C.

(57) ABSTRACT

Business data (including transactional data) may be gathered, stored, sorted, and/or collated into financial service organization (FSO) reports used by various entities of a FSO. A processing relationship configuration program may be used to create a processing relationship structure between various entities of the FSO. Processing relationship structure information may be stored on a database of an FSO. Nodes may be created and uniquely defined to represent FSO physical entities and/or FSO functions. A nodes structure may correspond to the processing relationship structure within an FSO. In some embodiments, an FSO application program, such as a report program, may be generated based on a defined processing relationship structure. The report records may be arranged in a particular sequence by one or more of the break key fields. Changes to the processing relationship structure may be automatically reflected in the reports generated by the report program.

39 Claims, 20 Drawing Sheets

U.S. PATENT DOCUMENTS

| | | | |
|---|---|---|---|
| 5,201,044 A | | 4/1993 | Frey, Jr. et al. |
| 5,233,513 A | | 8/1993 | Doyle |
| 5,257,366 A | | 10/1993 | Adair et al. |
| 5,386,566 A | | 1/1995 | Hamanaka et al. |
| 5,394,555 A | | 2/1995 | Hunter et al. |
| 5,434,994 A | | 7/1995 | Shaheen et al. |
| 5,455,947 A | | 10/1995 | Suzuki et al. |
| 5,483,632 A | | 1/1996 | Kuwamoto et al. |
| 5,499,330 A | | 3/1996 | Lucas et al. |
| 5,504,674 A | | 4/1996 | Chen et al. |
| 5,523,942 A | | 6/1996 | Tyler et al. |
| 5,524,205 A | | 6/1996 | Lomet et al. |
| 5,550,976 A | | 8/1996 | Henderson et al. |
| 5,586,310 A | | 12/1996 | Sharman |
| 5,638,508 A | | 6/1997 | Kanai et al. |
| 5,689,706 A | | 11/1997 | Rao et al. |
| 5,732,397 A | | 3/1998 | De Tore et al. |
| 5,745,901 A | | 4/1998 | Entner et al. |
| 5,768,505 A | | 6/1998 | Gilchrist et al. |
| 5,768,506 A | | 6/1998 | Randell |
| 5,797,134 A | | 8/1998 | McMillan et al. |
| 5,832,481 A | | 11/1998 | Sheffield |
| 5,864,679 A | * | 1/1999 | Kanai et al. ............... 709/238 |
| 5,870,711 A | | 2/1999 | Huffman |
| 5,870,746 A | | 2/1999 | Knutson et al. |
| 5,873,066 A | | 2/1999 | Underwood et al. |
| 5,907,848 A | | 5/1999 | Zaiken et al. |
| 5,909,683 A | | 6/1999 | Miginiac et al. |
| 5,930,759 A | | 7/1999 | Moore et al. |
| 5,933,816 A | | 8/1999 | Zeanah et al. |
| 5,937,189 A | | 8/1999 | Branson et al. |
| 5,950,169 A | | 9/1999 | Borghesi et al. |
| 5,987,434 A | | 11/1999 | Libman |
| 5,991,733 A | | 11/1999 | Aleia et al. |
| 5,991,756 A | | 11/1999 | Wu |
| 6,003,033 A | * | 12/1999 | Amano et al. ............. 707/100 |
| 6,038,393 A | | 3/2000 | Iyengar et al. |
| 6,049,665 A | | 4/2000 | Branson et al. |
| 6,064,983 A | | 5/2000 | Koehler |
| 6,081,832 A | | 6/2000 | Gilchrist et al. |
| 6,092,049 A | | 7/2000 | Chislenko et al. |
| 6,105,007 A | | 8/2000 | Norris |
| 6,112,209 A | | 8/2000 | Gusack |
| 6,115,690 A | | 9/2000 | Wong |
| 6,134,582 A | | 10/2000 | Kennedy |
| 6,163,770 A | | 12/2000 | Gamble et al. |
| 6,185,540 B1 | | 2/2001 | Schreitmueller et al. |
| 6,202,070 B1 | | 3/2001 | Nguyen et al. |
| 6,226,623 B1 | | 5/2001 | Schein et al. |
| 6,236,975 B1 | | 5/2001 | Boe et al. |
| 6,272,482 B1 | | 8/2001 | McKee et al. |
| 6,336,096 B1 | | 1/2002 | Jernberg |
| 6,341,287 B1 | | 1/2002 | Sziklai et al. |
| 6,385,612 B1 | * | 5/2002 | Troisi ............................ 707/7 |
| 6,442,533 B1 | | 8/2002 | Hinkle |
| 6,446,086 B1 | | 9/2002 | Bartlett et al. |

OTHER PUBLICATIONS

Borland, Russel; "Running Microsoft Outlook 97", Microsoft Press, 1997.

Juhl, Randy P., "The OTC Revolution", Drugtopics.com; Mar. 3, 1997, pp. 1–9.

Connections to the Americas, vol. 3, No. 1, CSC Continuum, Jan. 1997, 54 pages.

Connections to the Americas, vol. 3, No. 2, CSC Continuum, Feb. 1997, 54 pages.

Connections to the Americas, vol. 3, No. 3, CSC Continuum, Mar. 1997, 54 pages.

Connections to the Americas, vol. 3, No. 4, CSC Continuum, Apr. 1997, 47 pages.

Connections to the Americas, vol. 3, No. 5, Computer Sciences Corporation, May/Jun. 1997, 37 pages.

Connections to the Americas, vol. 3, No. 6, Computer Sciences Corporation, Jul./Aug. 1997, 58 pages.

Connections to the Americas, vol. 3, No. 7, Computer Sciences Corporation, Sep./Oct. 1997, 75 pages.

Connections to the Americas, vol. 4, No. 1, Computer Sciences Corporation, Jan. 1998, 63 pages.

Connections to the Americas, vol. 4, No. 2, Computer Sciences Corporation, Dec./Mar. 1998, 49 pages.

Connections to the Americas, vol. 4, No. 3, Computer Sciences Corporation, May/Jun. 1998, 46 pages.

Connections to the Americas, vol. 4, No. 4, Computer Sciences Corporation, Sep./Oct. 1998, 58 pages.

Insurance Connections, Computer Sciences Corporation, Feb./Mar. 1999, 49 pages.

Banking Connections, Computer Sciences Corporation, Apr./May 1999, 42 pages.

Insurance Connections, Computer Sciences Corporation, Jun./Jul. 1999, 52 pages.

Banking Connections, Computer Sciences Corporation, Aug./Sep. 1999, 49 pages.

Insurance Connections, Computer Sciences Corporation, Oct./Nov. 1999, 56 pages.

Cost Containment: Products and Solutions for the Property and Casualty Insurance Industry, Computer Sciences Corporation, Oct. 1999, 40 pages.

Banking Connections, Computer Sciences Corporation, Dec. 1999, 46 pages.

Insurance Connections, Computer Sciences Corporation, Feb./Mar. 2000, 59 pages.

Banking Connections, Computer Sciences Corporation, Apr./May 2000, 47 pages.

Insurance Connections, Computer Sciences Corporation, Jun./Jul. 2000, 42 pages.

Insurance Connections, Computer Sciences Corporation, Sep./Oct. 2000, 43 pages.

Banking Connections, Computer Sciences Corporation, Nov./Dec. 2000, 46 pages.

Continuum Connections, vol. I, No. 1, The Continuum Company, Inc., Nov. 1991, 17 pages.

Continuum Connections, vol. I, No. 2, The Continuum Company, Inc., Jan./Feb. 1992, 11 pages.

Continuum Connections, vol. I, No. 3, The Continuum Company, Inc., Mar./Apr. 1992, 15 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 18 pages.

Continuum Connections, vol. II, No. 2, The Continuum Company, Inc., Dec./Jan. 1993, 20 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 18 pages.

Continuum Connections to the Americas, vol. 1, No. 1, The Continuum Company, Inc., Sep. 1995, 49 pages.

Continuum Connections, vol. III, No. 4, The Continuum Company, Inc., Oct./Nov. 1995. 23 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 58 pages.

Continuum Connections to the Americas, vol. 2, No. 3, The Continuum Company, Inc., May 1996, 50 pages.

Continuum Connections to the Americas, vol. 2, No. 4, The Continuum Company, Inc., Jul. 1996, 54 pages.

Continuum Connections to the Americas, vol. 2, No. 5, The Continuum Company, Inc., Sep. 1996, 58 pages.

International search report application number PCT/ US 00/18016, mailed Nov. 10, 2000.

International search report application number PCT/US 00/18020 mailed Nov. 10, 2000.

* cited by examiner

| SEQ | ELEM-ID CONSTANT | LEVEL | ELEM-ID | ABBREV | DESCRIPTION |
|---|---|---|---|---|---|
| 1 | ISSUER | 1 | D1000 | ISS | ISSUER SUBSYS ID |
| 2 | COMPANYA | 2 | D1001 | COA | COMPANY A |
| 3 | REGION | 3 | D1002 | RGN | REGIONAL OFFICE |
| 4 | BRANCH | 4 | D1003 | BRN | BRANCH OFFICE |
| 5 | COMPANYB | 2 | D1011 | COB | COMPANY B |
| 6 | NONRISK | 3 | D1012 | NON | NON-RISK ACCOUNTS |
| 7 | BANK | 4 | D1013 | BNK | NON-RISK BANK |
| 8 | BRANCH | 5 | D1014 | BRN | BANK BRANCH |
| 9 | BANK | 3 | D1021 | BNK | BANK |
| 10 | COMPANYC | 2 | D1031 | COC | COMPANY C |
| 11 | RETAIL | 3 | D1032 | RET | RETAIL STORE |
| 12 | RETAILCARD | 4 | D1033 | RTC | PRIVATE-LABEL CREDIT CARD |
| 13 | ACQUIRER | 1 | D2000 | ACQ | ACQUIRER SUBSYS ID |
| 14 | COMPANYA | 2 | D2001 | COA | COMPANY A |
| 15 | REGION | 3 | D2002 | RGN | REGIONAL OFFICE |
| 16 | BRANCH | 4 | D2003 | BRN | BRANCH OFFICE |
| 17 | COMPANYB | 2 | D2011 | COB | COMPANY B |
| 18 | BANK | 3 | D2012 | BNK | BANK |
| 19 | BRANCH | 4 | D2013 | BRN | BANK BRANCH |

FIG. 6

| ISS, | COA, | RGN, | BRN | NODE NUMBER |
|------|------|------|-----|-------------|
| 10,  | 1,   | 10,  | 100 | 4 |
| 10,  | 1,   | 10,  | 200 | 5 |

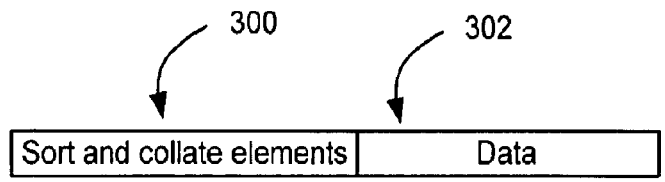
FIG. 11a
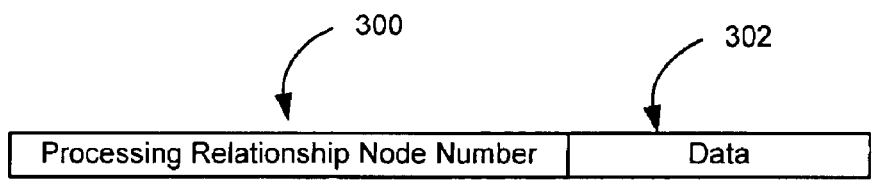
FIG. 11b
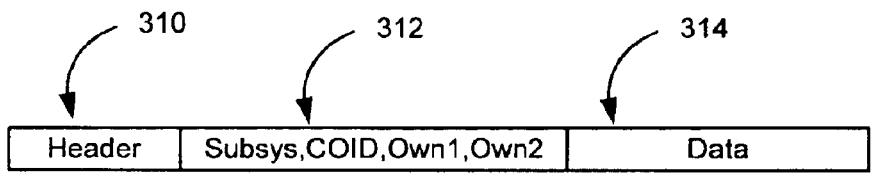
FIG. 11c
| Header | 10,1,10,200 | Data |
| Header | 10,1,10,100 | Data |
| Header | 10,1,10,100 | Data |
| Header | 10,1,20,100 | Data |
| Header | 10,2,10,300 | Data |
| Header | 10,1,10,200 | Data |
| Header | 20,1,10,100 | Data |
| Header | 10,1,10,100 | Data |
FIG. 11d
| Header | 10,1,10,100 | Data |
| Header | 10,1,10,100 | Data |
| Header | 10,1,10,100 | Data |
| Header | 10,1,10,200 | Data |
| Header | 10,1,10,200 | Data |
| Header | 10,1,20,100 | Data |
| Header | 10,2,10,300 | Data |
| Header | 20,1,10,100 | Data |
FIG. 11e

CONFIGURING SYSTEMS FOR GENERATING BUSINESS TRANSACTION REPORTS USING PROCESSING RELATIONSHIPS AMONG ENTITIES OF AN ORGANIZATION

PRIORITY CLAIM

This application claims the benefit of U.S. Provisional Application No. 60/162,411 entitled "Configuring Systems For Generating Business Transaction Reports Using Processing Relationships Among Entities Of An Organization," filed Oct. 29, 1999.

BACKGROUND OF THE INVENTION

1. Field of the Invention

The present invention generally relates to computer software programs and databases to be used in Financial Service Organizations. More particularly, the present invention relates to a system and method for configuring a Financial Service Organization (FSO) production system for gathering business data including transactional data, sorting the data, and collating the data into reports for the entities of the FSO.

2. Description of the Related Art

FSOs such as banks, credit unions, etc., use computer systems running software programs to process FSO transactions. The FSO systems may include one or more databases for storing data. The databases may include groups of data such as the master files of customer account information, transaction data such as customer credit card purchase transactions, processing data such as the processing parameters used in processing transactions, and history data such as log files of daily activities for batch processing.

FSO systems often utilize hardcoded software to process FSO transactions. Changes in the business environment often result in corresponding changes to the processing relationship among various entities of a Financial Service Organization (FSO). For example, new banks being acquired or new branch locations being opened often add to the processing structure of an FSO. FSO systems, which utilize hardcoded software, become more difficult to adapt to the changing processing structure. For example, it may be difficult to change the format of a hardcoded FSO report that has to be collated by regions, wherein one of the regions has expanded to cover more branch FSOs.

The following is hereby incorporated by reference: Object Oriented mail server framework mechanism (U.S. Pat No. 6,081,832), Object Oriented framework mechanism for order processing including predefined extensible classes for defining an order processing environment (U.S. Pat. No. 6,049,665), Object Oriented framework mechanism for determining configuration relations (U.S. Pat. No. 5,937,189), Object Oriented mail server framework mechanism (U.S. Pat. No. 5,768,505), Decentralized distributed asynchronous object oriented system and method for electronic data management, storage, and communication (U.S. Pat. No. 5,550,976) and Document display system for organizing and displaying documents as screen objects organized along strand paths (U.S. Pat. No. 5,499,330).

SUMMARY OF THE INVENTION

An improved method, system and carrier medium may be used to configure a Financial Service Organization (FSO) production system. Such a production system typically gathers business data (including transactional data), stores the data, sorts the data, and collates the data into FSO reports used by various entities of the FSO.

In one embodiment, a multilevel business structure, which may represent the processing relationship between various entities of the FSO, may be configured. A processing relationship configuration program may be used to configure, and subsequently modify, a processing relationship structure. A multilevel node structure may be defined to correspond to the processing relationship structure within an FSO. In one embodiment, one or more rows and one or more columns may represent the multilevel node structure. In one embodiment, a node may be created and uniquely defined to represent an FSO physical entity and/or an FSO function. In one embodiment, an FSO physical entity may be a bank, a branch office, a department, etc. An FSO function, in one embodiment, may be an issuer of credit cards.

In one embodiment, the user may construct a processing relationship structure by selecting a required processing relationship object from one or more objects represented on a display screen. The user may specify the values associated with the selected processing relationship object which may include level number, object name, object identifier, etc. More than one processing relationship object of the same type may be created e.g., multiple bank objects may be created as instances of a bank object. In one embodiment, a root level structure may include only one node. Nodes beneath a node may be referred to as descendents of the node. A node number may uniquely identify a node object in the processing relationship structure. Each newly created node in the functional relationship structure may be assigned a node identifier. In one embodiment, a user may assign a node identifier and the processing relationship configuration program may assign a node number. In one embodiment, the node identifier may be unique. By defining each of the nodes at each of the levels of the processing relationship structure the user may complete the configuration process. In one embodiment, an FSO database may be used to store the processing relationship structure information.

In one embodiment, any node and its relationship with other nodes may be edited to reflect current business conditions by using the edit processing function included in the processing relationship configuration program. In one embodiment, editing may include node operations such as insert, delete, change or expand. In one embodiment, FSO software, such as a program to generate reports, may use the processing relationship structure information to reflect current business conditions.

In one embodiment, an FSO report may be generated based on the defined processing relationship structure. A report record definition, used in the generation of reports, may be a data structure that defines the format of report records in an FSO system. In one embodiment, a report record definition may be created by selecting a data element included in a node and by adding the selected data element to the break key field included in the report record definition. In one embodiment, a report generation program may read a report format file, gather data from a collection of data i.e., transaction log record, extract data element values from the data collection and add the extracted data element values as break key fields and/or report data values in a report record. In one embodiment, the report data elements for which values are to be extracted and added to report records may be defined in a user configured report record definition in the report format file. After report generation program has gathered all report records to be processed into a report, the report records may be sorted on one or more break key fields. The report records may then be processed into reports. In one embodiment, each report record may represent one line in a report.

In one embodiment, the user of a FSO computer system may reconfigure or edit one or more data elements of the break key field included in the report record definition to change the report format. The report program may automatically keep track of changes made to the processing relationship structure.

BRIEF DESCRIPTION OF THE DRAWINGS

FIG. 6 illustrates one embodiment of an interactive computer display screen for configuring processing relationships, with five levels of objects displayed;

FIG. 7 illustrates one embodiment of an interactive computer display screen for creating instances of a first object in a processing relationships structure;

FIG. 11a illustrates the general format of one embodiment of a report record definition;

FIG. 11b illustrate an example of one embodiment of a report record definition;

FIG. 11c illustrates a format of one embodiment of a report record definition, showing the use of processing relationship nodes as break keys;

FIG. 11d illustrates an example of an unsorted set of report records constructed using the report record definition illustrated in FIG. 11b;

FIG. 11e illustrates the example set of report records constructed using the report record definition illustrated in FIG. 11b after sorting on the processing relationship break keys;

Figure 1:
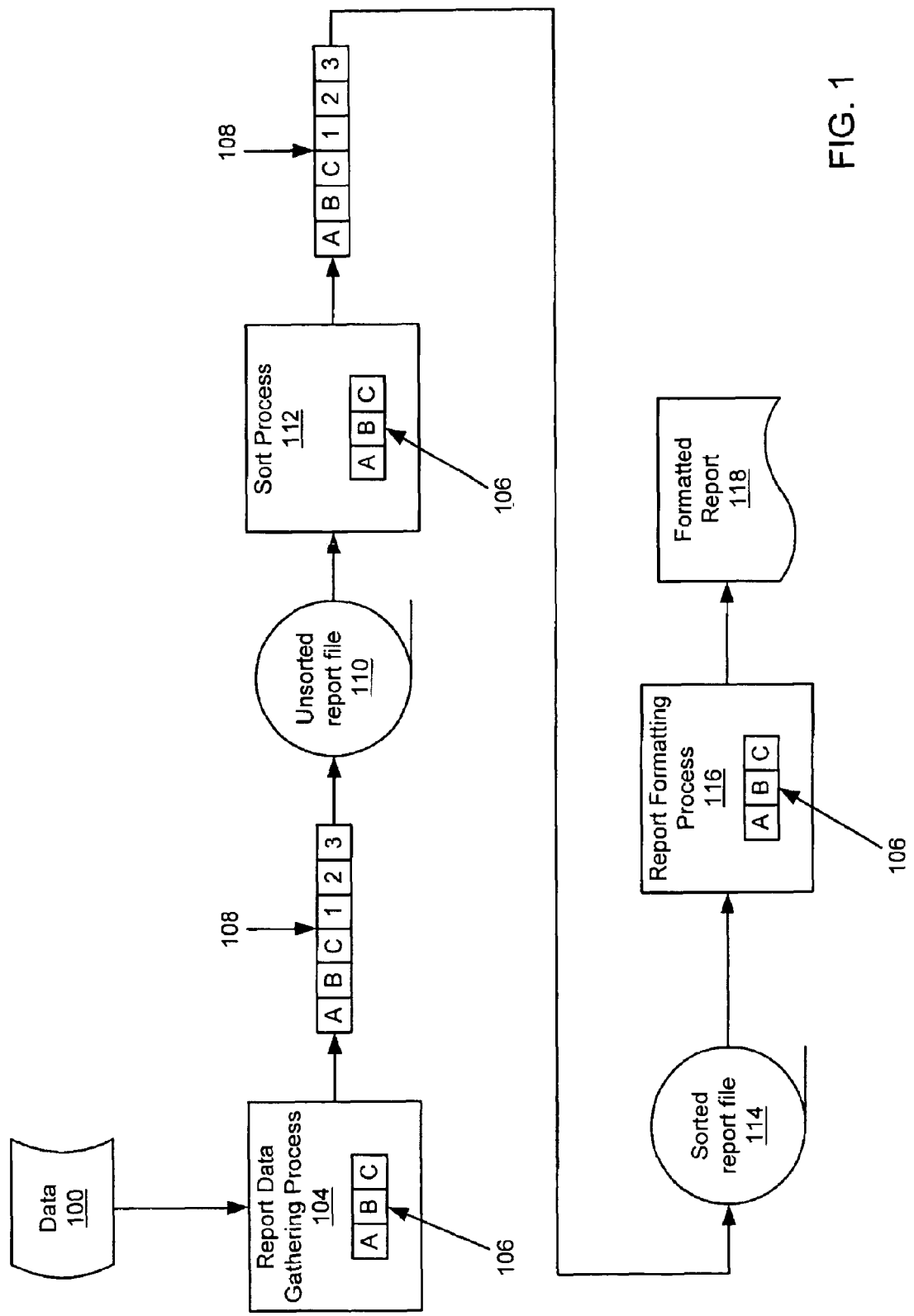
FIG. 1 is a data flow diagram illustrating the use of hardcoded break keys for sorting and collating reports on business transaction records and accounts in one embodiment of an FSO business transaction processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for configuring the FSO system software programs and databases in an FSO system, and for processing FSO transactions in the FSO system, as described herein. The software program(s) may be implemented in any of various ways, including procedure-based techniques, component-based techniques, and/or object-oriented techniques, among others. For example, the software program(s) may be implemented using ActiveX controls, C, C++objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Examples of operating systems may include, but are not limited to: Windows NT available from Microsoft Corporation, and; the MVS and OS/390 operating systems available from IBM. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

The following twenty-two paragraphs introduce various terminologies, definitions, abbreviations, etc., as used herein to describe various embodiments.

As used herein, a Financial Service Organization (FSO) is a business organization that provides financial services to customers and client organizations. As used herein, the term customer generally refers to an individual, and client organization generally refers to other businesses, including retail businesses and other FSOs. Services provided to customers and client organizations include credit products, such as loans and credit cards. An FSO may also provide services to client organizations such as credit card transaction processing. Examples of FSOs include, but are not limited to, banks and credit unions. An FSO that issues credit cards and processes credit card transactions may be referred to as a credit card institution. An FSO may include one or more organizational units.

Examples of organizational units include, but are not limited to, main offices, divisions, regional offices, and branch offices.

As used herein, an FSO transaction may be defined as an occurrence of a service provided to a customer or client organization. Examples of FSO transactions include, but are not limited to, financial transactions such as deposits, withdrawals, loan application servicing, and credit card application servicing. FSO transactions may also include services related to financial products such as loans and credit cards previously issued to FSO customers and client organizations. These services may include processing of credit card purchases and collection of payments.

An FSO system may include a data dictionary. A data dictionary may be defined as a collection of descriptions of data items in the database. A description of a data item in a database may be called a data element. A data item may be referred to as a data element value. A data element in the data dictionary may describe attributes of a data element value in the database. Examples of attributes of data element values include, but are not limited to: location in the database, size, and data type. For example, an FSO system data dictionary may describe the data elements involved in credit card processing. The data dictionary may describe each of the data elements in the database for credit card processing. Groups of data such as master files and transaction data may comprise data elements defined in the data dictionary. Examples of data elements in an FSO data dictionary include, but are not limited to: customer name, credit card type, and card issuer.

As used herein, a key is one or more data elements in a database record or group of records that may be used to identify the record or group of records. For example, a record for storing information about an individual may have a name data element. The name data element may be used as a key to identify a particular individual's record in the database. A key value is an instance of a key in the database. In the example above, an example of a key value for a name data element used as a key might be "John Smith." In some examples, not all data elements in a database may be available for use in keys. Data elements that are available for use in keys may be referred to as key elements.

The format of a key may be stored in a key definition. A key definition may include one or more key elements that in combination make the key. During configuration of an FSO system, key definitions may be used in creating key values for records or groups of records in the database. During processing, key definitions may be used by the FSO system to create key values and to read key values stored in the database. During the processing of a transaction, the FSO system may create a key value from a transaction-related data using a key definition to extract data element values from the transaction-related data, and may compare the key value to key values stored in the database while searching for a matching key value. A key value created during processing from a key definition and a transaction-related data may be referred to as a processing key value.

As used herein, the term "break key" has a different meaning than the term "key" described above. A break key may be defined as a field in a record that may be used as a sort field and/or as a collating field for the record. For example, a set of records may have a field A designated as a break key. Each record's break key field may be set to a break key value. When the records are sorted by a sort process, the sort process may sort the records on the break key field. The sort may be done in ascending or descending order. A break key field may be used in collating the records after a sort. For example, a first group of records with a first break key value may be written to a first file, and a second group of records with a second break key value may be written to a second file.

The FSO system database may include processing parameters used in processing transactions. Processing parameters may be used to apply business logic to the transactions during processing. An example of a transaction processed in an FSO system is a credit card purchase transaction. An example of a processing parameter is a credit card purchase transaction price that may be charged to a client of a credit card institution for the processing of a credit card purchase transaction. An instance of a processing parameter in the database may be referred to as a processing parameter value. For example, an instance of a credit card purchase transaction price might be "$1.50." In some cases, a processing parameter value may include more than one data value. For example, a matrix of data values used in transformation functions on tables of data may be stored as a processing parameter value.

An FSO transaction processing software program may use one or more processing parameters during the processing of a transaction. A processing parameter may have a different processing parameter value for different transactions. The software program may examine the values of one or more data elements in the transaction data and master files to determine the processing parameter value for the transaction. A combination of data elements used to determine the processing parameter value may be referred to as the key definition for the processing parameter. The combination of data element values constructed from the key definition may be referred to as a key value. For example, a software program for processing credit card transactions for a credit card institution may use the credit card issuer and card type to determine what transaction price to charge a client of the credit card institution for processing a credit card transaction. The key definition in this example includes the credit card issuer data element and card type data element, and the key value is constructed from the values for the credit card issuer data element and card type data element read from the credit card transaction data or from a master file associated with the transaction.

In one embodiment, processing parameter values and the key values used to identify the processing parameter values may be stored in tables in the database. The tables in the database that store the processing parameter values and key values may be referred to as Process Control Data (PCD) tables or processing parameter tables. In one embodiment, there may be one PCD table for each processing parameter in the FSO system.

Processing parameters are one example of parameters that may be stored in PCD tables and located using key definitions as described herein. Examples of other types of parameters that may be stored in PCD tables are default parameters and definition parameters. Default parameters may be used to fill in default information in records in the database when they are created. For example, when a new customer account is created, one or more fields in the customer account master file may be filled with default parameter values. Default parameter values may be retrieved from PCD tables using key values constructed from the PCD key definitions and data element values from the customer account master file. Definition parameters are text or numeric values that are located using key values as codes. An example is a text error message that may be looked up using a numeric error code as a key value.

During processing, an FSO transaction may be stored as a record or file in the FSO system. In one embodiment, the FSO transaction may be stored in the FSO system database. A portion of the FSO transaction record may be read into system memory during processing. An FSO transaction record may include one or more data elements. The data elements included in an FSO transaction record may be defined in the data dictionary. The data elements in the transaction record may describe the various attributes of the transaction. For example, the data elements in a credit card transaction record may include items such as the customer's name, account numbers, credit card type, card issuer, date of the transaction, and the business at which the transaction originated.

An example of an FSO that may use an FSO computer system as described herein is a credit card institution. A credit card institution may issue credit cards to customers and client institutions of the FSO. The credit card institution may also issue credit cards on behalf of client businesses such as department stores. The credit card institution may also acquire and process credit card transactions from customers and client businesses such as department stores. For example, a credit card institution may issue its own credit card. Continuing the example, the credit card institution may also have client department stores. The credit card institution may issue a credit card under a department store's name, and may collect and process all credit card transactions for the department store. The credit card institution may charge a fee for each transaction processed. Some of the credit card transactions collected by the credit card institution may be transactions for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

In the above example, the fee charged for each transaction, also called the merchant transaction price, is an example of a processing parameter for an FSO system in a credit card institution. One embodiment of an FSO system database in a credit card institution may include a merchant transaction pricing PCD table. The merchant transaction pricing PCD table may include one or more merchant transaction pricing values. Each merchant transaction pricing value may be associated with one unique key value in the table. The key values in the PCD table may be constructed using a key definition. Each processing parameter in the FSO system, and thus each PCD table, may be associated with a key definition. In one embodiment, the FSO system database may include a key definition table for storing key definitions in the FSO system.

A key definition may include one or more data elements from the data dictionary. As an example, the merchant transaction pricing parameter described above may have a key definition that includes one or more data elements. Examples of data elements that may be included as fields in the merchant transaction pricing parameter key definition include card issuer, card type, on us/not on us, and transaction type. A card issuer may be the brand of card, for example, VISA, MasterCard, Discovery, etc. Examples of card types may include, but are not limited to: "gold" and "platinum" cards issued by some card issuers, On us/not on us refers to whether the FSO processing the transaction also issued the credit card. "On us" may mean that the FSO did issue the card. "Not on us" may mean that another FSO issued the card, and thus the transaction may be forwarded to the other FSO for processing. The term "transaction type" may refer to the way the transaction was entered; examples of transaction types may include, but are not limited to: manual, electronic, and telephone transactions. A manual credit card transaction may be a credit card transaction that is entered by hand and imprinted with a credit card imprint machine. An electronic transaction may be a credit card transaction where the magnetic strip on a credit card is read electronically. A telephone transaction may be a credit card transaction performed by telephone call.

The organizational and/or functional structure of an FSO may be represented in a FSO computer system by a processing relationship structure. A processing relationship structure may be defined as a computer representation of the entities in the FSO and of the relationships among the entities, wherein the computer representation is useable by software applications to process FSO business data based upon the organizational and/or functional structure of the organization. In one embodiment, the processing relationship structure may be stored in a database on the FSO computer system. In one embodiment, the processing relationship structure may be configured by a user of the FSO system at configuration of the FSO system or during FSO system runtime. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system.

The data dictionary may include one or more processing relationship data elements. One or more processing relationship data elements may be included as key fields in a key definition. In one embodiment, a processing relationship data element may be a Processing Relationship Node Number data element, and the Processing Relationship Node Number data element may be included in a key definition. Thus, a processing parameter value may be located in a PCD table using processing relationship data elements such as the Processing Relationship Node Number data element. This allows processing parameter values to be located for transactions based upon the ownership of the account for which the transaction was generated.

In one embodiment, a processing relationship node number may be logged with a transaction record when the transaction is closed or written to a logfile, wherein the processing relationship node number uniquely identifies a processing relationship node instance in the processing relationship structure. The processing relationship node number in the transaction record may then be used by the system to identify the owner of the transaction record's account in the processing relationship structure.

An FSO transaction processing system may include multiple report formats for generating reports on account-related data such as transactions, account master files, etc. Report formats may be stored in a database, and may include information defining the page layout, contents, and functions of the report. One example of a report function may be a summary of one or more data fields on the report, such as adding a column of account balance totals for a bank to report a total account balance for the bank. Report record definitions may also be stored in the database of the FSO transaction processing system. Report record definitions may include fields defining report record header information, one or more break keys, and one or more report data elements to be collected ("gathered") into report records from account-related data. Report record definitions may be used by a report data gathering process to extract break key values and report data values from account-related data and to store the values in report records.

In one embodiment, report records may be stored in a report record file by the data gathering process. At some point, a report generation process may read the report records stored in the report record file, sort the records, and generate one or more formatted reports including the contents of the report records. For example, an FSO system may gather report records into report record files, "close" the day at 2 p.m., and generate daily reports from the report records in the report record files. In some reports, one line may appear in a report for each report record read by the report. Some reports may include the results of one or more functions applied to the data values in the report records, such as summary reports. The report generation process may sort the report records in a report record file on one or more of the break key values that may be stored in the report records. In one embodiment, break keys in report record definitions may be assigned a sort order, and the report generation process may sort the report records on the break keys in the specified sort order. Thus, the report generation process may sort the report records by a first break key, and then a second break key, etc.

Reports in an FSO system may be generated from logfiles, wherein the logfiles are used to collect records of events in the FSO system over a period. The FSO system may take a "snapshot" of a portion or all of its databases and generate reports from the snapshot of the databases. Types of reports in an FSO system may include journal reports, for example, journal reports of a day's activities, and portfolio reports, i.e. a "snapshot" of the entire FSO's business data.

The report generation process may include a data gathering process, wherein break key values and report data values are extracted from transaction records or other sources and stored in report records, and a report creation process, wherein the report records are read, sorted, collated and formatted into reports. The data gathering process may also be referred to as an "implosion" and the report creation process as an "explosion."

Using processing relationships as break keys in report record definitions allows the FSO system to output reports, including rollups, totals, and subtotals, in the way that the FSO defines its business, not on a fixed level, because the definition of the business may be accomplished by a user of the system at configuration and/or runtime of the system, where previously the definition of the business was hardcoded into the source code of the FSO system software.

FIG. 1—A Data Flow Diagram Illustrating the use of Hardcoded Break Keys for Sorting and Collating Reports on Business Transaction Records and Accounts in One Embodiment of an FSO Business Transaction Processing System FIG. 1 is a data flow diagram illustrating the use of hardcoded break keys for sorting and collating reports on business transaction records and accounts in one embodiment of an FSO business transaction processing system. Data 100 may be input into a report data gathering process 104. A hardcoded break key definition 106 may be embedded in the source code of the report data gathering process 104. Report data gathering process 104 may use hardcoded break key definition 106 to locate and extract break key values from data elements in data 100. Report data gathering process 104 may also use a hardcoded report data definition (not shown) to locate and extract report data values from data elements in data 100. The extracted break key values and report data values may be combined in a report record 108, and the report record 108 may be added to a group of report records in a report record file 110. Report records may be added to report record file 110 in a random order, and therefore may be considered unsorted in the report record file. After report records have been gathered in report record file 110, a sort process 112 may read the report records in unsorted report file 110 and use hardcoded break key definition 106 to sort the report records and output the sorted records 108 to a sorted report record file 114. A report formatting process 116 may then read the sorted report records from report record file 114, use hardcoded break key definition 106 to collate the report records, and generate one or more formatted reports 118 including collated report records and summaries of report records.

The hardcoded break key definitions necessitate the modification of source code, recompilation of executable programs, and reinstallation of the system to affect a change in a break key definition. The break key definition may be hardcoded in the source code separately for each of the report data gathering process 104, sort process 112, and report formatting process 116, necessitating the maintenance of the break key definitions in multiple source code locations. The hardcoding of break key definitions result in a fixed, inflexible sorting and collating format for reports.

Report sorting and collating formats must be pre-defined and embedded in the source code. For processing relationships used as break keys in reports, hardcoding limits report sorting and collating to a fixed number of levels in the processing relationship, and the processing relationship may be limited to a symmetrical structure.

Figure 2:
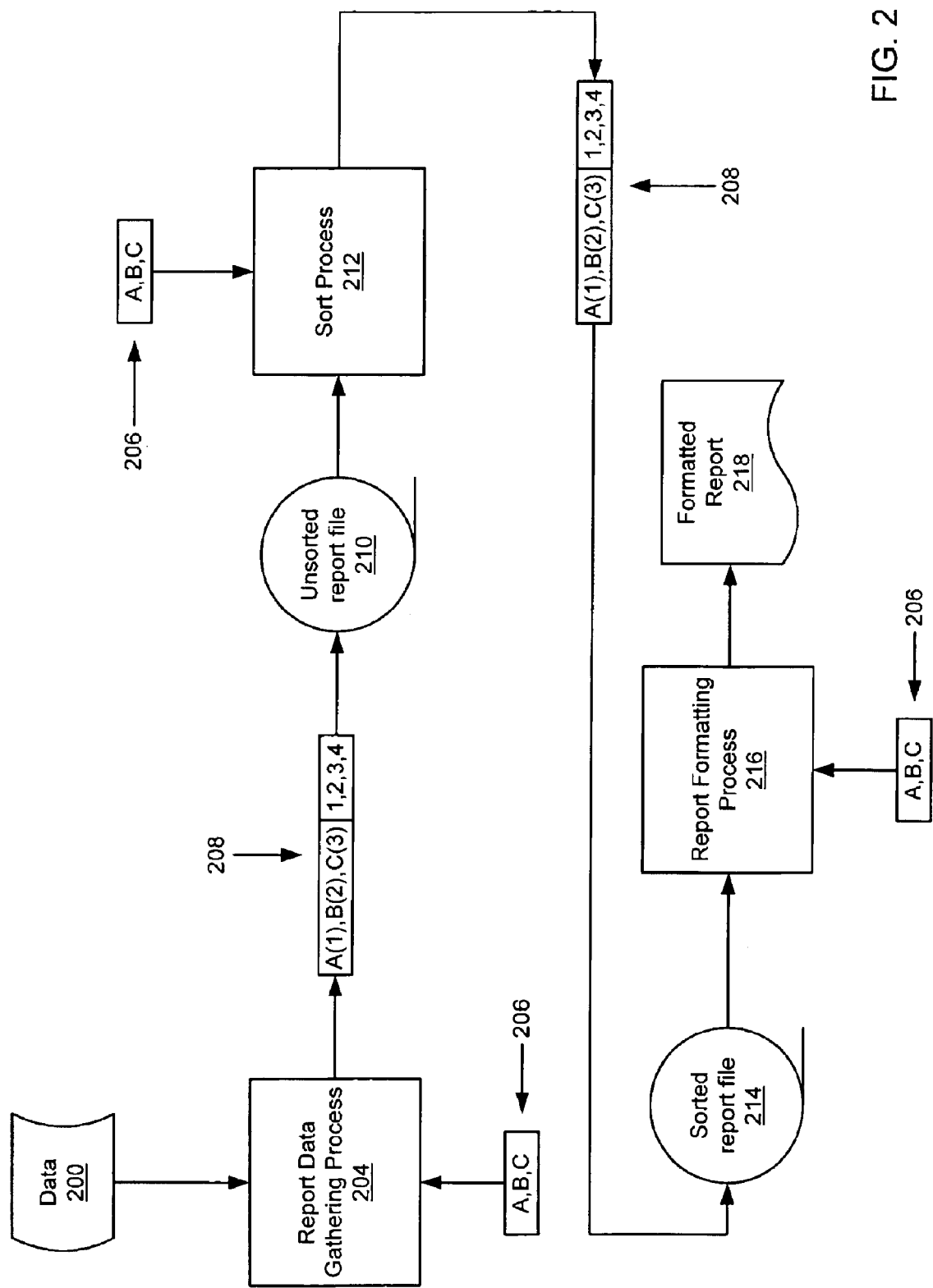
FIG. 2 is a data flow diagram illustrating the use of external, user-configurable break keys for sorting and collating reports on business transaction records and accounts in an embodiment of an FSO business transaction processing system in one embodiment of the present invention.

FIG. 2—a Data Flow Diagram Illustrating the Use of External, User-Configurable Keys for Sorting and Collating Reports on Business Transaction Records and Accounts in an Embodiment of an FSO Business Transaction Processing System in One Embodiment of the Present Invention FIG. 2 is a data flow diagram illustrating the use of external, user-configured keys for sorting and collating reports on business transaction records and accounts in one embodiment of an FSO business transaction processing system. Data 200 may be input into a report data gathering process 204. An external, user-configured break key definition 206 may be read by data gathering process 204. Report data gathering process 204 may use break key definition 206 to locate and extract break key values from data elements in data 200. Report data gathering process 204 may also use an external, user-defined report data definition (not shown) to locate and extract report data values from data elements in data 200. The extracted break key values and report data values may be combined in a report record 208, and the report record 208 may be added to a group of report records in a report record file 210. Report records may be added to report record file 210 in a random order, and therefore may be considered unsorted in the report record file. After report records have been gathered in report record file 210, a sort process 212 may read the report records in unsorted report file 210 and use external, user-configured break key definition 206 to sort the report records and output the sorted records 208 to a sorted report record file 214. A report formatting process 216 may then read the sorted report records from report record file 214, use external, user-configured break key definition 206 to collate the report records, and generate one or more formatted reports 218 including collated report records and summaries of report records.

Figure 3A:
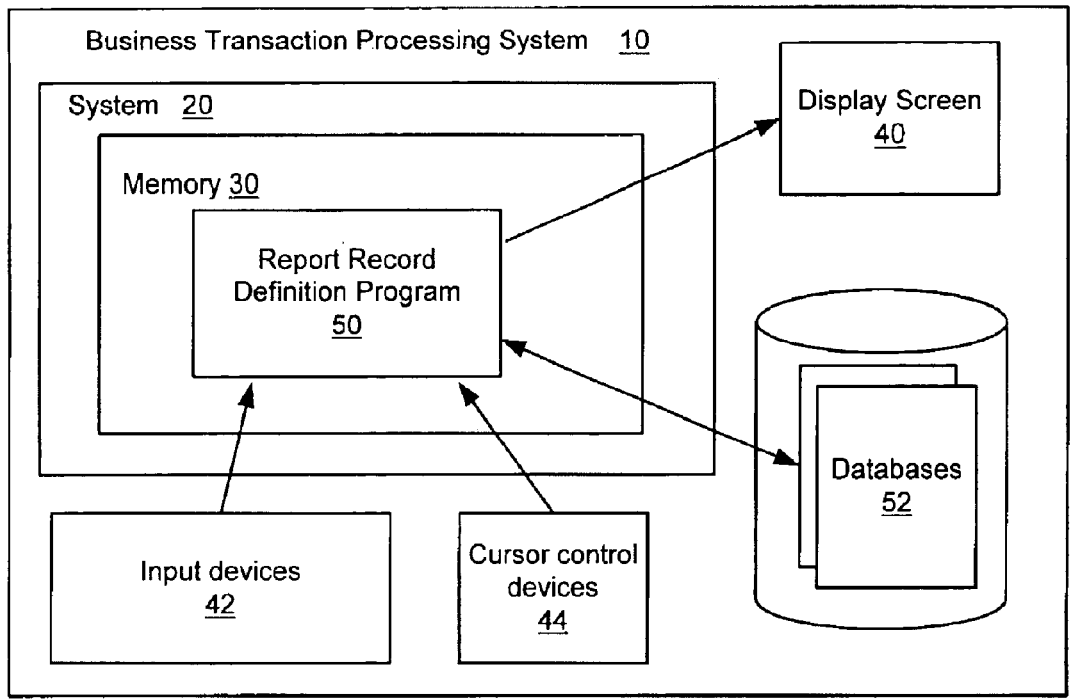
FIG. 3a is a block diagram illustrating one embodiment of an FSO computer system for the user configuration of report record definitions.

FIG. 3a—A Block Diagram Illustrating One Embodiment of an FSO Computer System for the User Configuration of Report Record Definitions In FIG. 3a, an embodiment of an FSO business transaction processing system 10 may include a computer system 20, a display screen 40 connected to the computer system, and one or more databases 52 residing on external storage. Computer system 20 includes memory 30 configured to store computer programs for execution on computer system 20, and a central processing unit (not shown) configured to execute instructions of computer programs residing on computer system 20. Report record definition program 50 may be stored in memory 20. System 10 may also include a business transaction processing program (not shown). In one embodiment, Report record definition program 50 may be integrated in the business transaction processing program, so that configuring report record definitions may be viewed as a function within the business transaction processing program. System 10 may also include one or more input devices 42 such as a keyboard for entering data and commands into program 50, and one or more cursor control devices 44 such as a mouse.

Figure 3B:
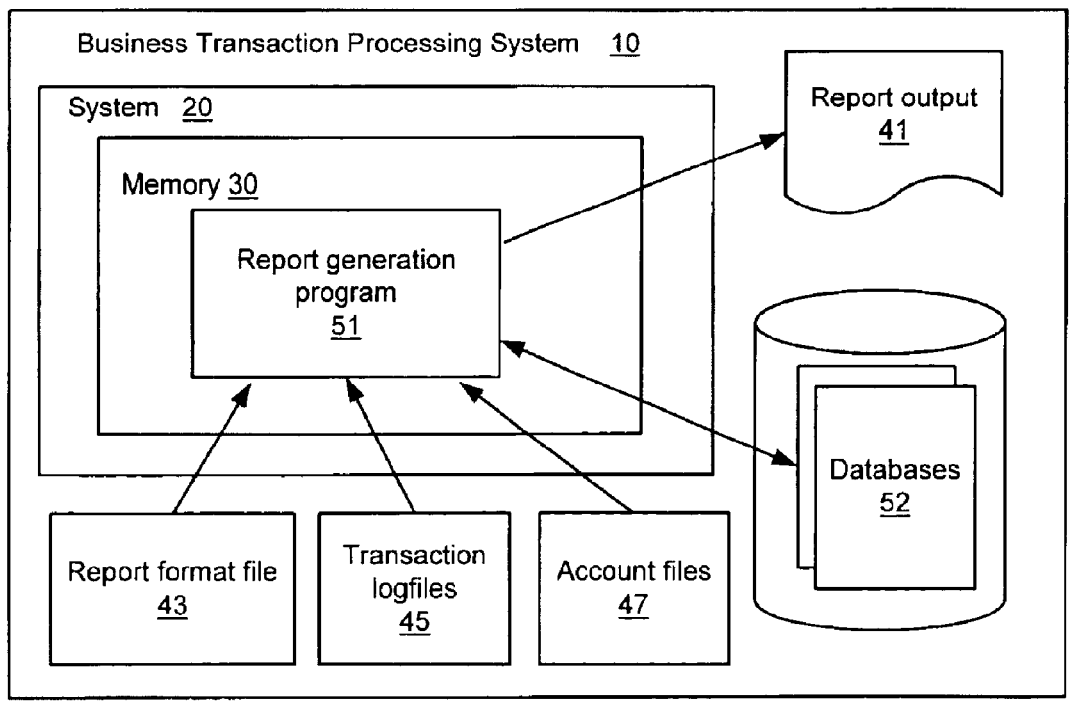
FIG. 3b is a block diagram illustrating one embodiment of an FSO computer system where user-configured report record definitions are used in report generation.

FIG. 3b—A Block Diagram Illustrating one Embodiment of an FSO Computer System where User-Configured Report Record Definitions are Used in Report Generation In FIG. 3b, an embodiment of an FSO business transaction processing system 10 may include a computer system 20, a display screen(not shown) connected to the computer system, and one or more databases 52 residing on external storage. Computer system 20 includes memory 30 configured to store computer programs for execution on computer system 20, and a central processing unit (not shown) configured to execute instructions of computer programs residing on computer system 20. Report generation program 51 may be stored in memory 20. System 10 may also include a business transaction processing program (not shown). In one embodiment, report generation program 51 may be integrated in the business transaction processing program, so that configuring processing relationships may be viewed as a function within the business transaction processing program.

System 10 may also include one or more report format files 43 that may include one or more report record definitions for use in generating reports. In one embodiment, report record definitions may be stored separately from the report format files in a report record definition file. Report format files 43 may also include report formatting information such as report layout, title and header information, functions to be performed upon report breaks, etc. System 10 may also include transaction logfiles 45 and account files 47. Transaction logfiles 45 may include log records of FSO business transactions executed over a period. Account files may include customer and merchant account information such as account master files. Transactions, transaction logfiles, account files and other collections of data may include one or more data elements. Some of the data elements in the collections of data may be data elements that uniquely identify the node instance in a processing relationship structure that the data collection is associated with. For example, a transaction log record may include a "node number" data element that corresponds to a unique node number of a node instance in the user configured processing relationship structure for the FSO.

Report generation program 51 may read a report format file 43, gather data from a collection of data (such as a transaction log record), extract data element values from the data collection and add the extracted data element values as break key values in a report record and as report data values in the report record. The data elements for which values are to be extracted and added to report records may be defined in a user-configured report record definition in the report format file 43. After report generation program 51 has gathered all report records to be processed into a report, the report records may be sorted on one or more break key fields. The report records may then be processed into reports. In one embodiment, one report record generates one line on a report. Report breaks may occur in the report when a change in one or more break key values is detected. For example, if there are 20 report records, the first ten report records have a break key value of 3, and the second ten report records have a break key value of 5, a first report may be generated for the records including the break key value of 3 when report generation program 51 detects that the break key value changes from 3 to 5. A second report may be generated for the records including the break key value of 5. One or more report outputs 41 may be generated by report generation program 51. Reports may be output in a variety of way, including, but not limited to: report displays on computer display screen, hardcopy reports such as reports printed on computer printers, and electronic reports such as reports stored on a memory medium or transmitted electronically to remote locations.

Figure 4:
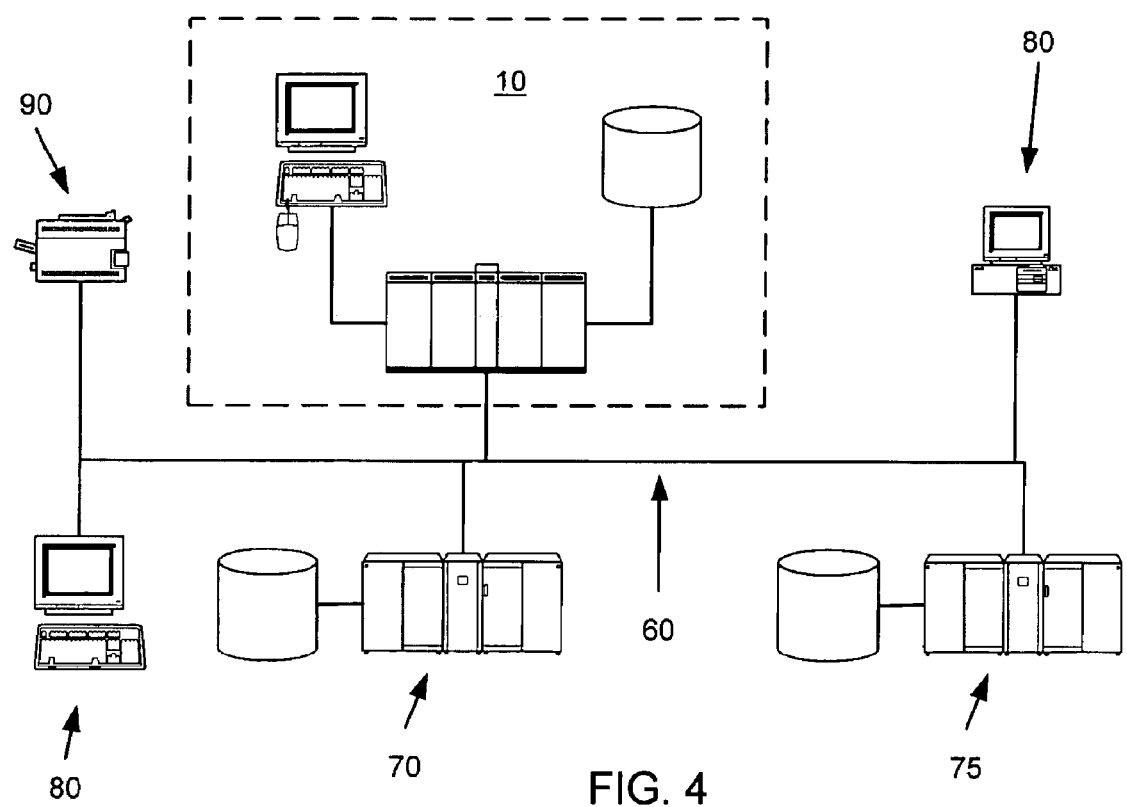
FIG. 4 illustrates one embodiment of an FSO computer system integrated into a networked system for processing FSO business data.

FIG. 4—One Embodiment of an FSO Computer System Integrated into a Networked System for Processing FSO Business Data FIG. 4 illustrates one embodiment of a networked system configured for processing FSO business data. Network 60 may be a local area network or wide area network, and may include communications links including, but not limited to, Ethernet, token ring, Internet, satellite and modem. An FSO computer system 10 as illustrated in FIGS. 3a and 3b may be connected to network 60. One or more user workstations 80 may be connected to network 60 and may be used by users of the FSO computer system to enter and modify data, initiate data processing tasks, and monitor the processing of data in the FSO computer system. One or more printers 90 for outputting hardcopy reports on FSO system data may also be connected to network 60. One or more other FSO computer systems 70 may also be connected to network 60. In one embodiment, one or more computer systems 75 of client businesses of the FSO may also be connected to network 60. Client businesses of the FSO may forward business transactions to the FSO computer system for processing. In one embodiment, computer systems 75 may include computer systems belonging to one or more entities within the FSO, such as branches, regional offices, banks, departments, etc.

FIGS. 5a–5f—Various Embodiments of Configuring a Processing Relationship Structure That May be Modeled after an FSO Business Organization Structure A Financial Service Organization (FSO) is a business organization that provides financial products and services to customers and client organizations. An FSO may include one or more organizational units. Examples of organizational units include, but are not limited to, an entity, a business unit, a subsidiary, a division, a functional unit, a headquarter, an operating unit, a profit center, a regional office, and a branch office.

Figure 5A:
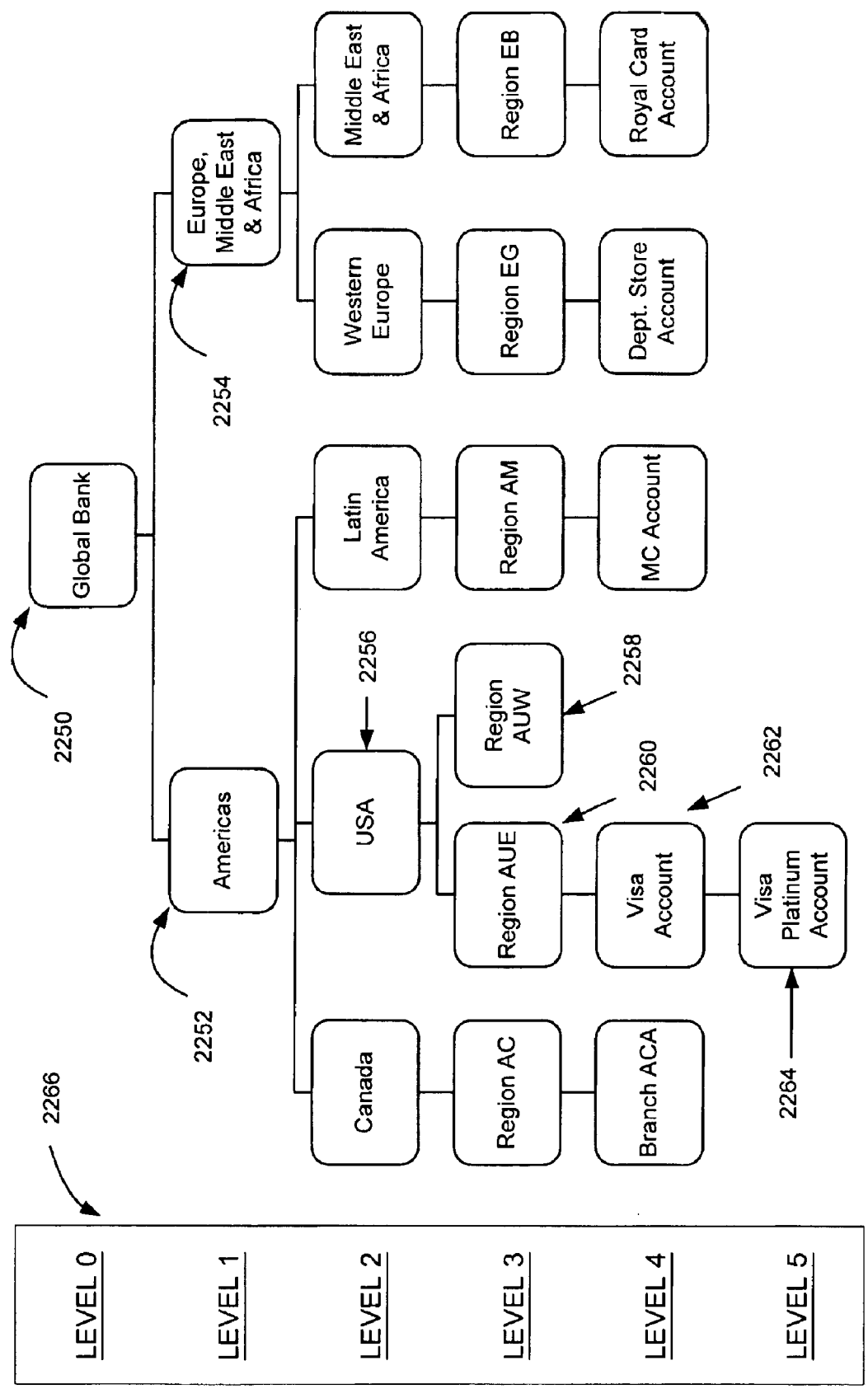
FIGS. 5a–5e illustrate various embodiments of configuring a processing relationship structure that may be modeled after an FSO business organization structure

FIG. 5a illustrates one embodiment of an FSO business organization. For example, the FSO business organization may be a global bank 2250. The FSO business units may be represented in a chart or a similar graphical form to illustrate the attributes of an FSO organization such as, but not limited to, the reporting relationship between various FSO entities, the reporting structure, the number of hierarchical levels between the highest level entity and the lowest level entity, the number of direct reports for an FSO entity. Each FSO entity may be represented as a node or a block on an FSO organizational chart. For example, global bank is represented as node 2250, the business unit for Americas by node 2252, the business unit for Europe, Middle East and Africa by node 2254. Each node may have a parent node and one or more children nodes. For example, USA business unit has a parent node i.e., Americas 2252 and has two children nodes, i.e., region aue 2260 and region auw 2258. Each node may be identified uniquely with a node number and/or a name. The FSO organizational chart may include multiple levels 2266 in the hierarchical relationship. A node without a parent may be described as a root node or a level zero node. A root node may include the entire FSO organization. The global bank node 2250 may be described as a root node. The FSO organizational chart may be updated, in real-time, as new FSO entities are introduced or removed by adding or deleting a node corresponding to the FSO entity. The FSO organizational chart may thus graphically represent the current, real world.

In one embodiment, an FSO user may create a similar or identical processing relationship structure modeled after the FSO business organization. In one embodiment, an FSO user may use a processing relationship configuration software program to configure or define the processing relationships between various FSO entities, which represent the FSO business organization. In one embodiment, an FSO user may configure a node in the processing relationship structure, which may provide same or similar functionality provided by the real world FSO entity. In one embodiment, there may be a one-to-one correspondence between a node included in the FSO business organization chart and a node included in the processing relationship structure.

In one embodiment, the processing relationship structure 2276 may be based on object-oriented technology. Each node in the processing relationship structure 2276 may be represented by a software object, which may be defined by the methods and properties associated with the object. For example, in one embodiment, a node may be represented by a bank object. The bank object may include properties such as, but not limited to, bank locations, ATM locations, types of customer accounts, types of loans. The bank object may include methods such as, but not limited to, add_new_account, add_new_location, delete_current_loan. In one embodiment, an FSO user may create various classes of objects such as a class of bank objects. A user may create an instance of the class to create, for example, a new global bank. The new global bank object may inherit all of the properties and methods associated with the class of bank objects.

Figure 5B:
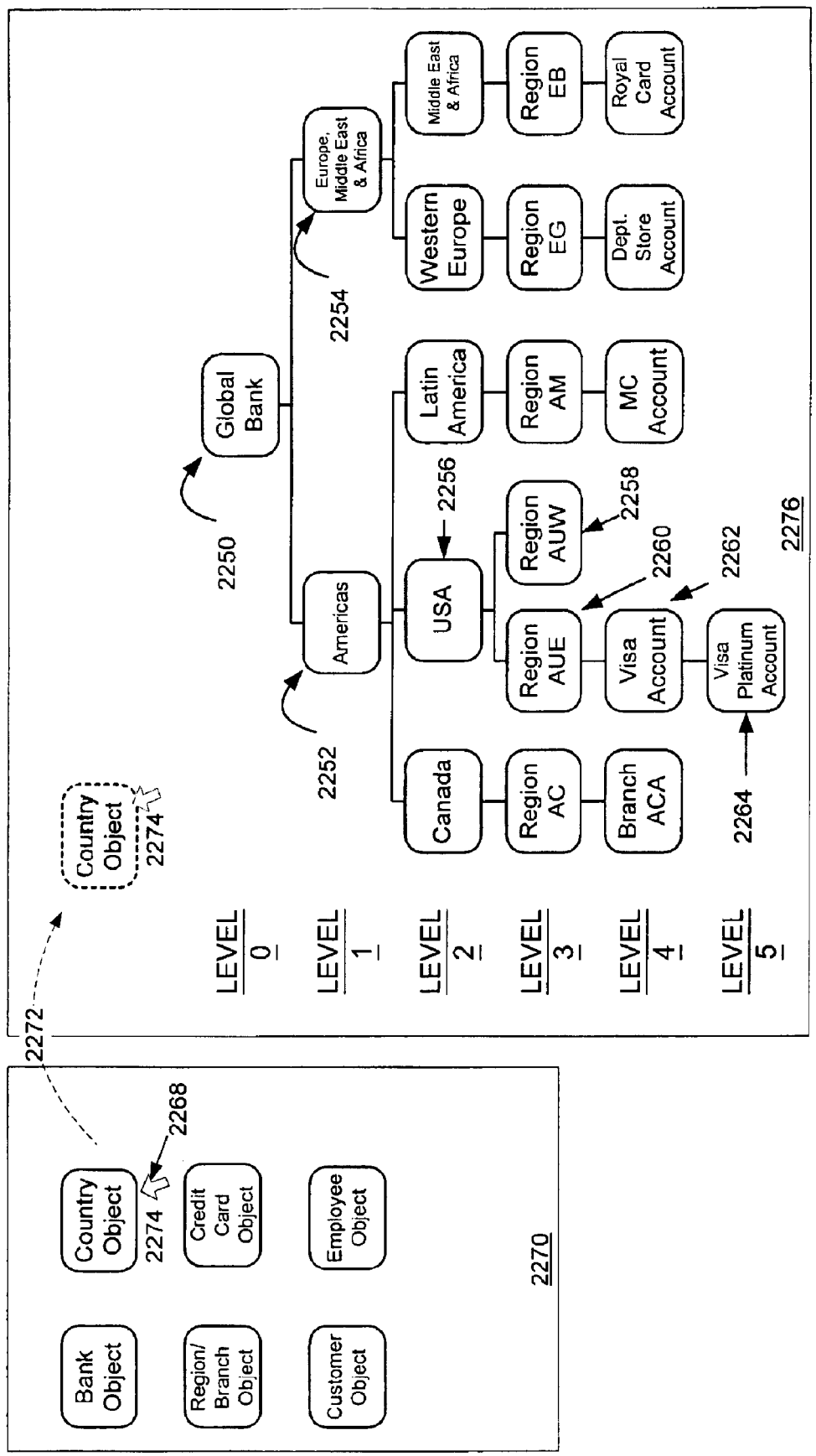

In one embodiment, the processing relationship structure 2276 may be represented graphically on a display screen, as illustrated in FIG. 5b. A user of an FSO may modify or edit the processing relationship structure 2276 by adding or deleting a node, e.g. the object associated with the node. In one embodiment, the node or object may be represented on a display screen as an icon or a symbol. In one embodiment, a group of objects, each represented as an icon, may be displayed as palette of objects 2274 on a display screen. In one embodiment, the user may use drag-and-drop techniques to add a new object selectable from a palette of objects 2274 to the processing relationship structure. For example, the FSO user may position a cursor 2268 on a node object 2274 and use a drag-and-drop method 2272 to place the selected object 2274 on the processing relationship structure. The FSO user may then configure the node, i.e. the object by using and/or defining the properties and methods associated with that node.

Figure 5C:
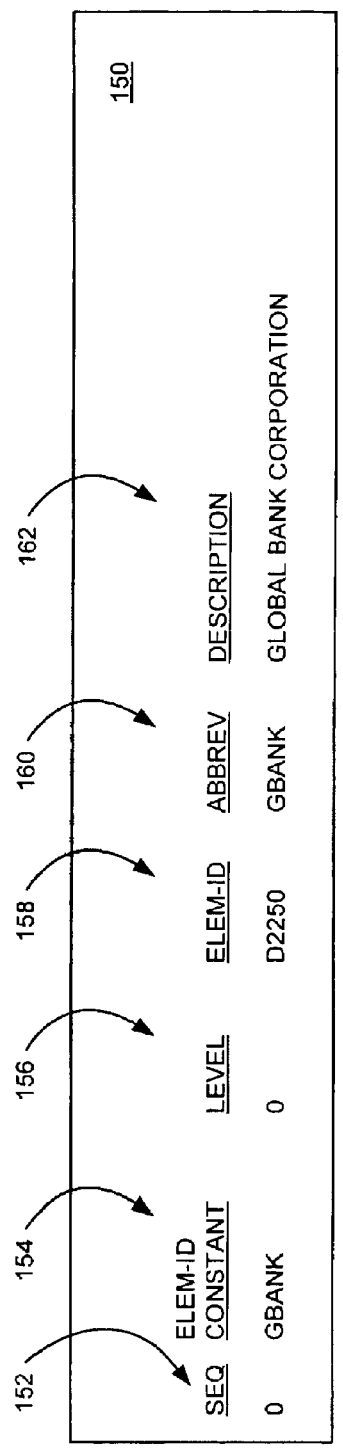
Figure 5D:
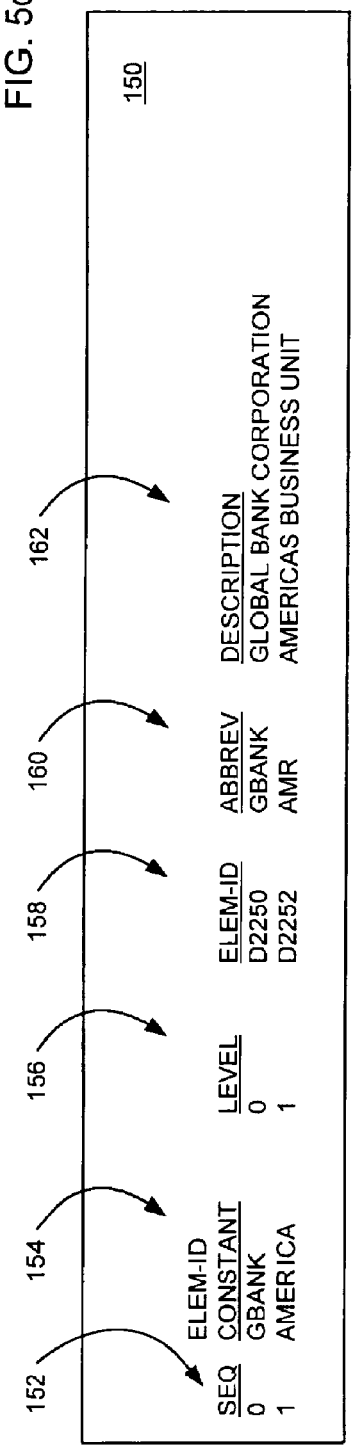
Figure 5E:
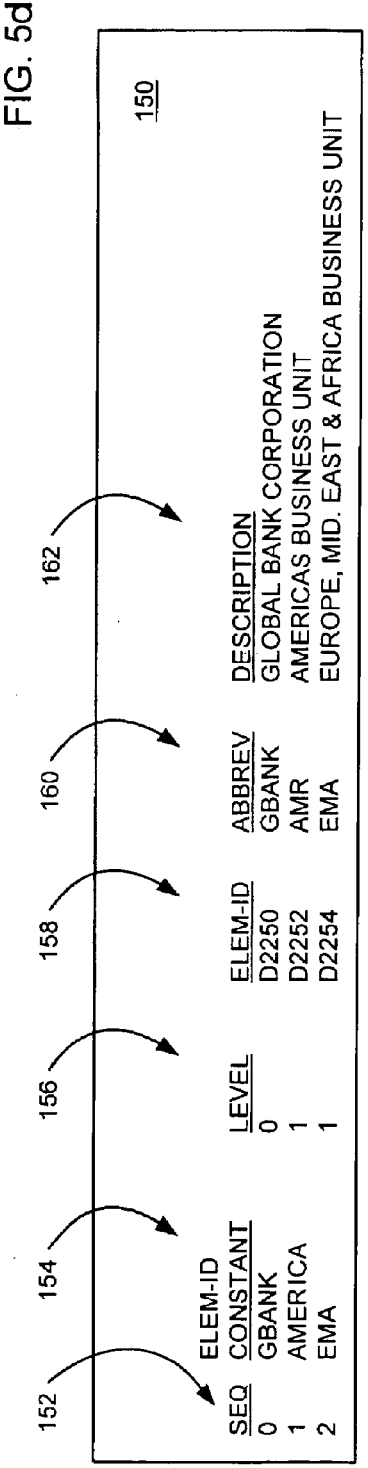

In one embodiment, the processing relationship structure may be based on traditional programming and traditional database technology. Programming in the C language may be an example of traditional programming. Examples of traditional database technologies may include, but not be limited to, hierarchical, proprietary, relational, flat file. Each node in the processing relationship structure may be represented, in one embodiment, by a table in a relational database. A node may be defined by the rows and columns associated with the table. For example, in one embodiment, a bank table may represent a node. The bank table may include attributes such as, but not limited a node identifier, a level number, a sequence number, a bank location identifier, an ATM location description, a customer account number, a type of loan. Access to the bank table may include identifying required keys such as, but not limited to a transaction identifier, an account number, an FSO user identifier. In one embodiment, the processing relationship structure may be represented by text on a display screen 150, as illustrated in FIGS. 5c–d. The parent/child or a precedent/descendent relationship may be defined in one embodiment by defining a previous node identifier and a next node identifier. An FSO user may modify or edit the processing relationship structure by adding or deleting a row in a table associated with the node being edited. The FSO user may add the root level node 2250 in FIG. 5c. In one embodiment, the FSO user may add a first row to a global bank table. The user may configure the processing relationship structure by entering values for attributes such as, but not limited to, a node identifier, a level number, a sequence number. In FIG. 5d, the FSO user may insert a row to add node 2252 for Americas. The user may configure the new node by entering values for attributes such as, but not limited to, a node identifier, a level number, a sequence number. In FIG. 5e, the FSO user may insert a row to add node 2254 for Europe, Middle East and Africa. The process may be repeated for all of the remaining nodes included in the global bank business organization chart in FIG. 5a. The FSO user may perform a modification to the processing relationship structure, i.e., reconfigure based on changes in the real world.

In one embodiment, an expert system may perform all the functions of an FSO user. An expert system may be programmed to duplicate or re-create all of the functions performed by the FSO user. For example, an expert system may graphically configure and/or modify the processing relationship structure.

In one embodiment, it may be possible to make the processing relationship structure identical to the FSO business organization. By using the same objects and/or tables the FSO user may eliminate the need to map real-life FSO entities with corresponding objects, which replicate the properties and/methods associated with the real-life FSO entities. Thus, the FSO user may automatically create and/or update a processing relationship structure when the user creates and/or modifies the FSO business organization structure. In one embodiment, the user may be able to create separate processing relationship objects from the FSO entity objects such that the processing relationship objects may be able to automatically mirror or track their corresponding master FSO objects.

The processing relationship structure may be used by FSO application software programs to process FSO transactions. Examples of application software, which may utilize the processing relationship structure, may include, but are not limited to, a report generation program, a credit card transaction processing program, a billing program, a monthly account reconciliation summary program. In one embodiment, changes made to the node associated objects and/or tables may have little or no effect on the application software program source code. For example, in FIG. 2a the global bank may reorganize its visa account business unit 2262 such that the visa unit now falls under region auw instead of region aue. This change may have little or no impact on the report generation program source code for the visa account business unit 2262 since all the objects and/or tables associated with the visa account node, i.e., the owner of the data, may get automatically updated when the FSO user makes changes to the processing relationship structure. The application programs may, in one embodiment, reference the current properties and/or attributes of the node objects and/or tables to process FSO transactions.

Figure 5F:
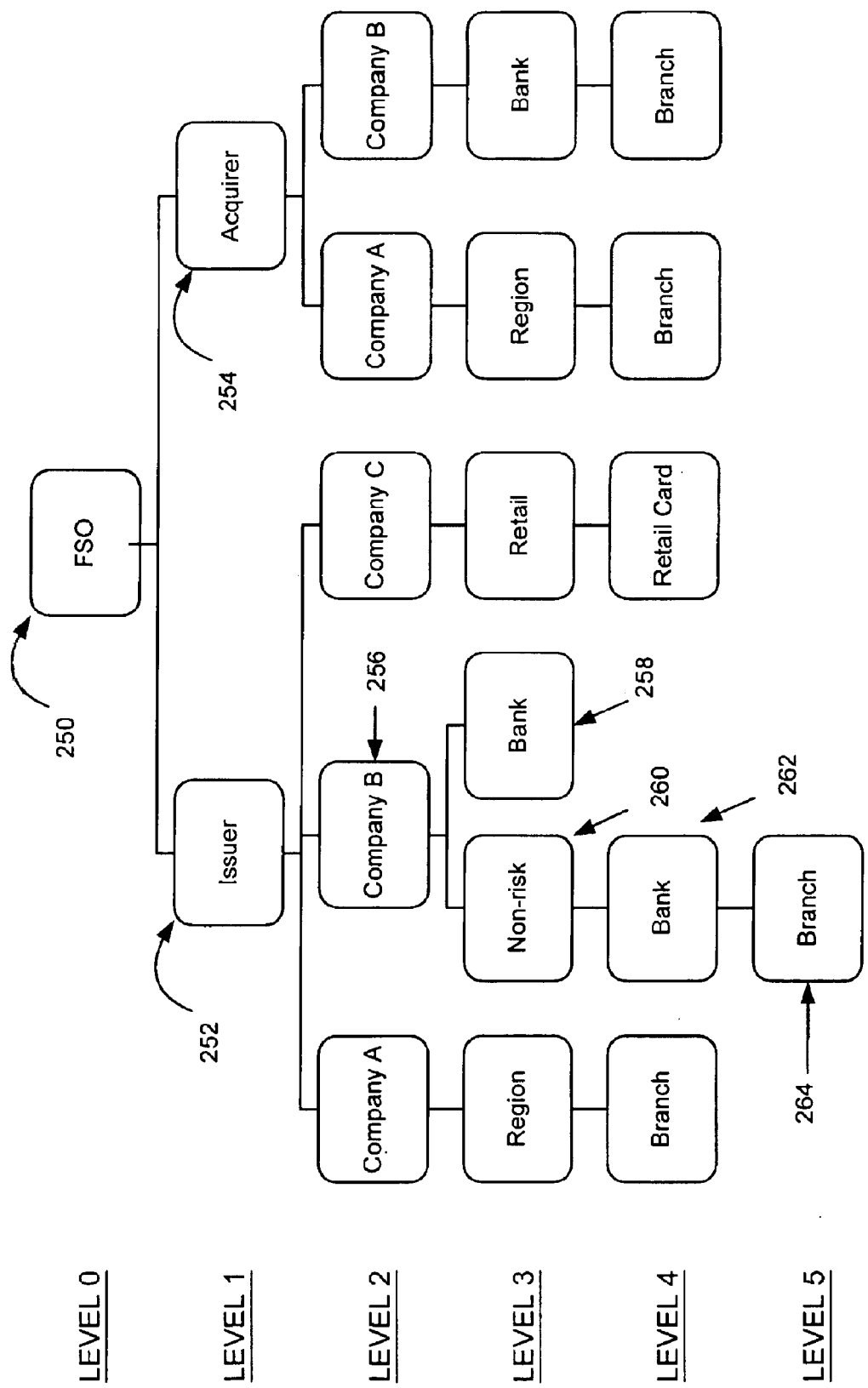
FIG. 5f is an example of one embodiment of a multilevel business processing relationship to be modeled in an FSO business system.
Figure 8:
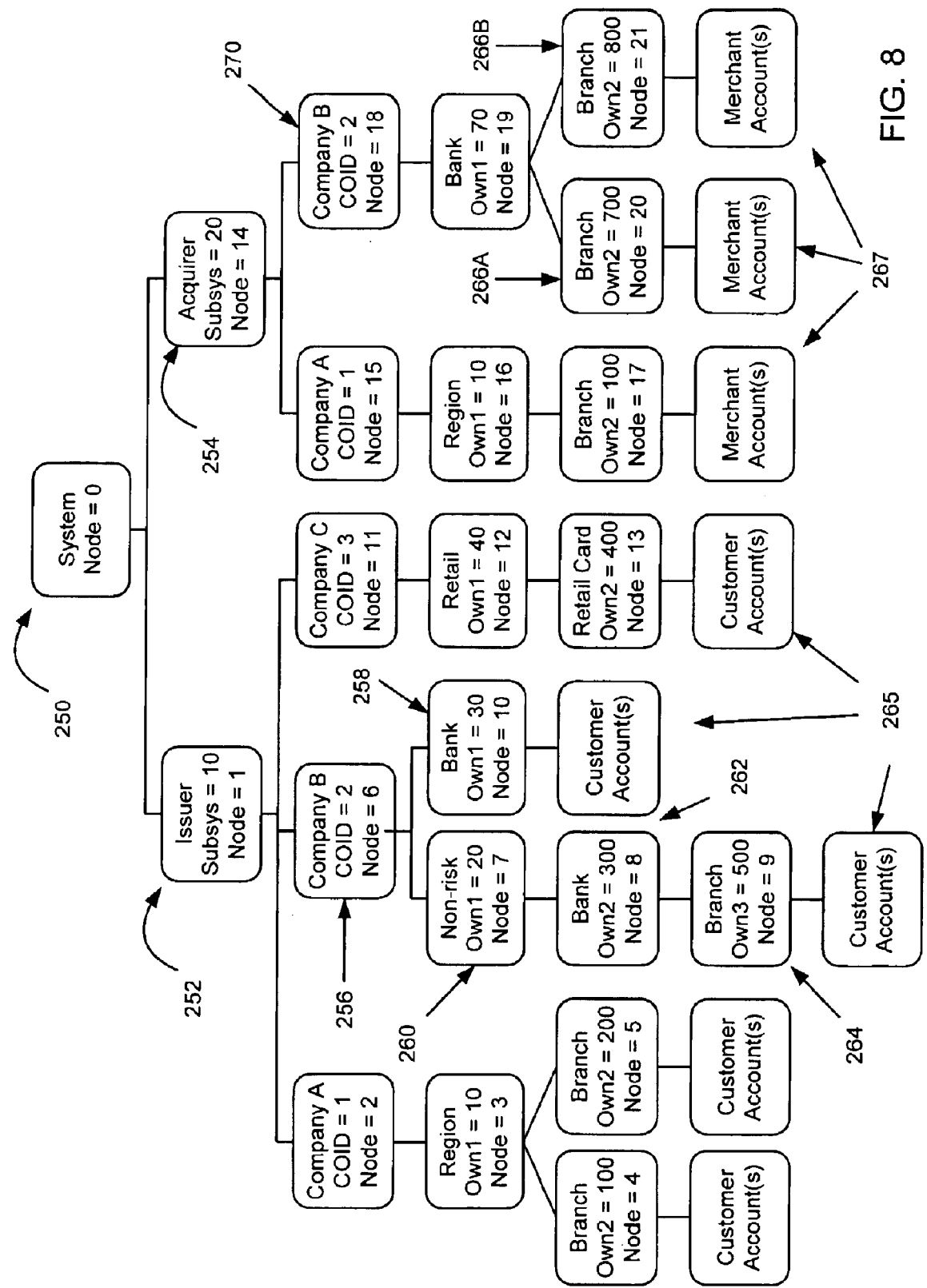
FIG. 8 is an example of one embodiment of a computer model of the a multilevel business processing relationship illustrated in FIG. 5f, wherein values have been assigned to the objects in the processing relationship.

FIG. 5f through FIG. 8, further illustrate various embodiments of configuring a processing relationship structure by starting with a representative FSO organization structure in FIG. 5f and ending with a corresponding processing relationship structure in FIG. 8.

Various Embodiments of Configuring a Report Program Based on the FSO Business Organization Structure In one embodiment, the FSO application programs such as the report program may be based on object-oriented technology. In one embodiment, each report required by the FSO may be represented by a software object. An FSO user may define methods and properties associated with a report object. In one embodiment, the report object may include properties such as, but not limited to, number_of_rows, number_of_columns, report_title, report_header, report total, report date. The report object may include methods such as, but not limited to, get_value, column_sub_total, row_count, grand_total, sort. In one embodiment, an FSO user may create various classes of objects such as a class of report objects. A user may create an instance of the report class to create, for example, a new daily report for visa account 2262 or a weekly report for region auw 2258.

In one embodiment, an FSO user may create a report object for gathering or collecting the data from the data sources and storing the gathered data in a report record file. In one embodiment, another report object may be created to manage report records, e.g., store, sort, etc. In one embodiment, a report object may be created to format and generate a report by reading report records stored in a records file and printing the output to a file or to a printer per specified format.

The new report object may inherit and/or further customize the properties and methods associated with the class of report objects. In one embodiment, the report object may interface, in real-time, with other software objects such as the objects associated with the nodes included in the processing relationship structure. The report object may, in real-time, invoke methods and access/change properties of the nodes.

In one embodiment, the FSO application programs such as the report program may be based on traditional programming and traditional database technology. Each report may be represented, in one embodiment, as a table in a relational database. A particular report may be represented by the rows and columns associated with a table. The report table may include attributes such as, but not limited to, a node identifier, a break level number, a sequence number, a report location identifier, an attribute description, a report frequency, a report type number. Access to the report table may include identifying required keys such as, but not limited to a report identifier, an account number, a node identifier.

In one embodiment, an FSO user may define or set up or configure a plurality of reports in various formats and/or styles for use by the FSO. The report format may include, but not be limited to, the definition related to the page layout, content and function. The definition of a report, e.g., the report record definition may include fields or properties for defining a report header, one or more break keys, one or more data elements to be collected (or gathered) into report records from the data sources. In one embodiment, the data source may be a property or an attribute of an account-related node included in the processing relationship structure. In one embodiment, the break keys to be used in the report format may be defined in a particular order. For example, in one embodiment, the break keys may identify visa account 2262 charge totals by branch, state, region and country.

Figure 9:
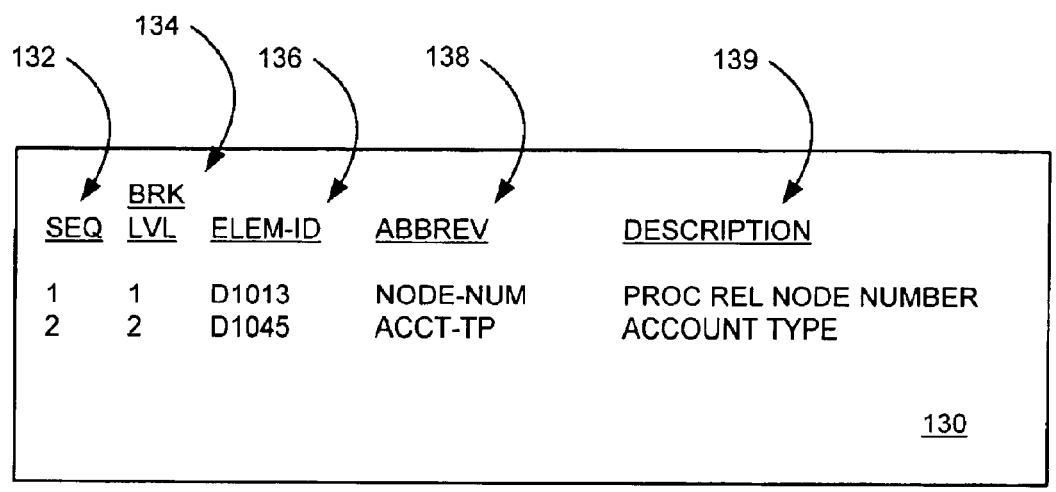
FIG. 9 illustrates one embodiment of an interactive computer display screen for specifying data elements to be used as break keys in a report record definition.

In one embodiment, the report record definition may be represented by text on a display screen 130, as illustrated in FIG. 9. In one embodiment, invoking the define_record_definition method of a report object may display screen 130. A sequence number, a break level number, a node identifier, an attribute and a descriptor may represent the report record definition, in one embodiment. An FSO user may modify or edit the report record definition by adding or deleting a row in a table associated with the break key being edited. The user may configure the report record definition by entering values for attributes such as, but not limited to, a node identifier, a break level number, a sequence number. The process may be repeated for all of the remaining report record definitions included in the database. The FSO user may perform a modification to the report record definition, i.e., reconfigure it based on changes in the real world.

Figure 10A:
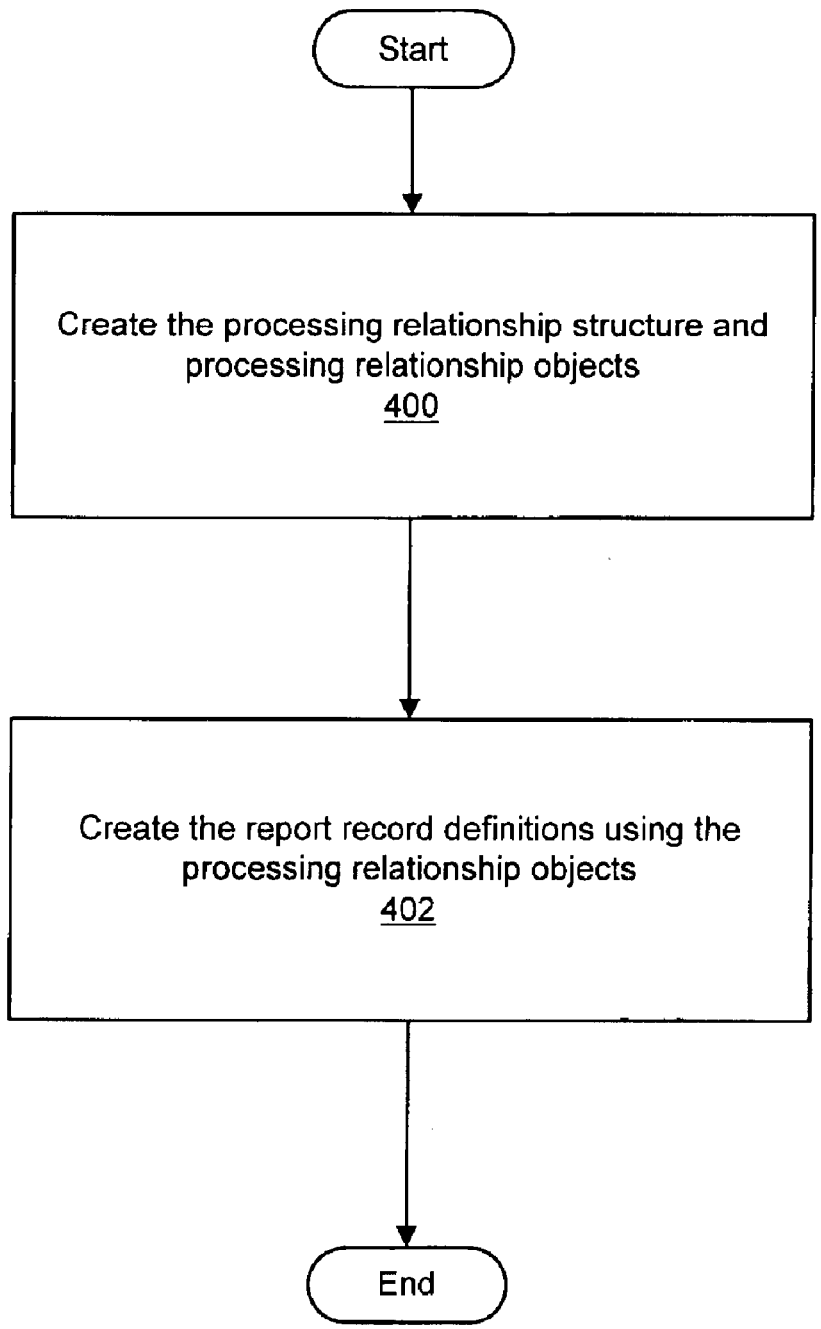
FIG. 10a is a high-level flow chart illustrating one embodiment of a method of configuring processing relationships and report record definitions in an FSO system.
Figure 10B:
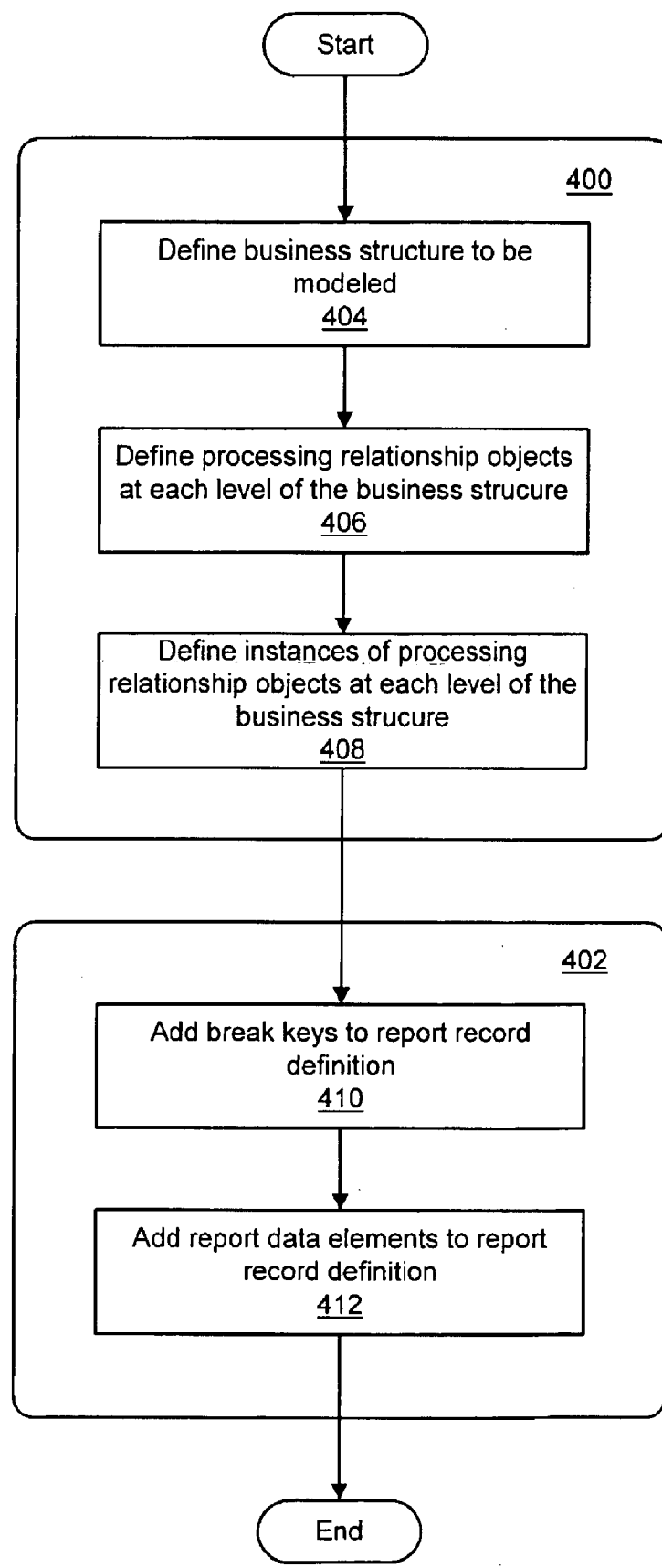
FIG. 10b is a mid-level flow chart illustrating one embodiment of a method of configuring processing relationships and report record definitions in an FSO system.
Figure 10C:
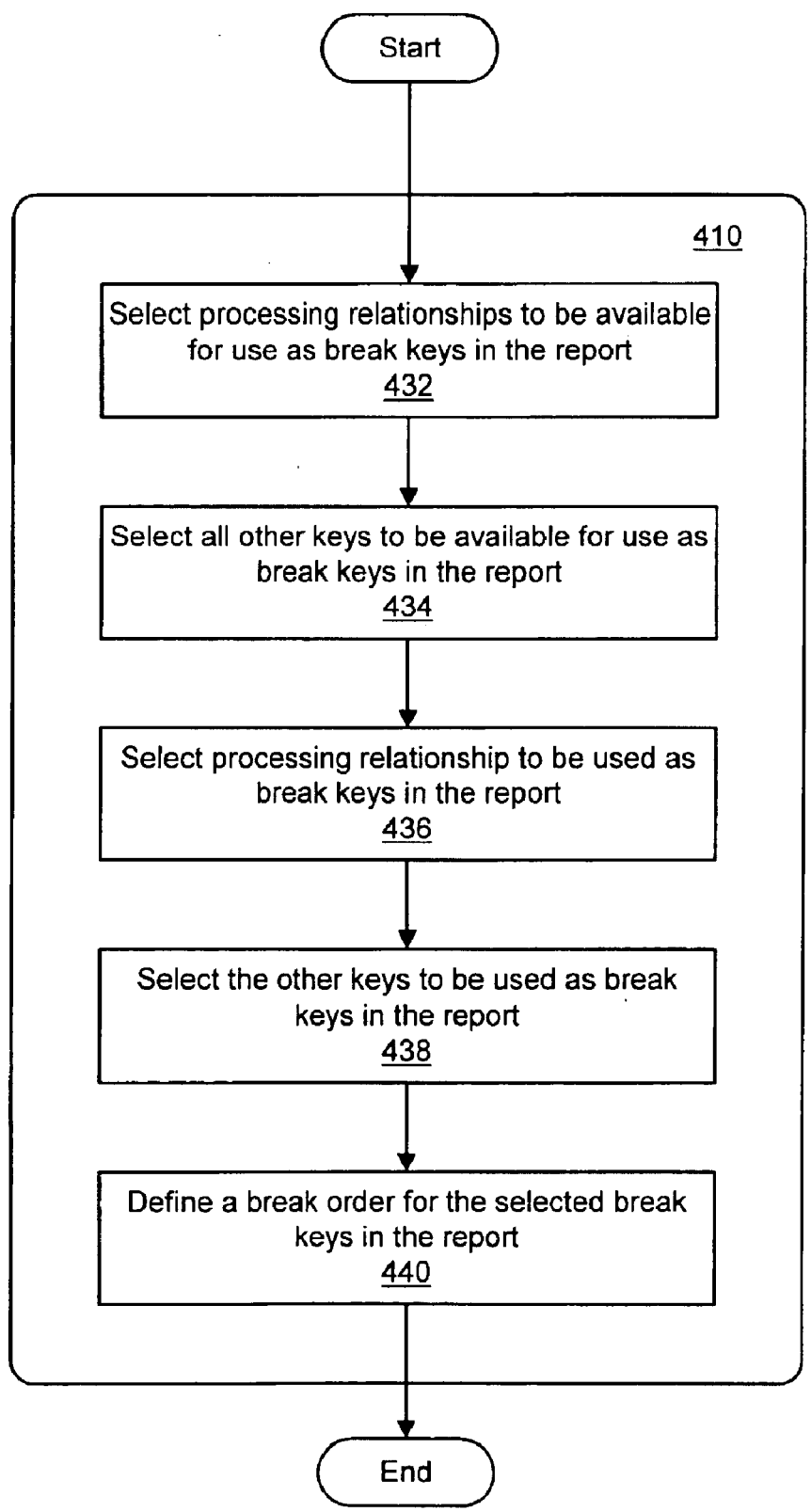
FIG. 10c is a detailed flow chart illustrating one embodiment of a method of configuring break keys in report record definitions in an FSO system.

FIG. 9 further illustrates an embodiment of a display screen to configure break keys in a report record definition. FIGS. 10a–10c include flow charts illustrating various embodiments of a method of configuring report record definition using the processing relationship structure. FIGS. 11a–11e and 12 illustrate one embodiment of a structure of a report record definition. FIGS. 13a–13b include flow charts illustrating embodiments of a method to gather and format reports based on the configured report record definition.

FIG. 5f—an Example of one Embodiment of a Multilevel Business Processing Relationship to be Modeled in an FSO-Business System FIG. 5f graphically illustrates one embodiment of a multilevel business processing relationship that may be modeled by a user of an FSO business system using a processing relationships configuration program. In this example, six levels are shown (levels 0–5). Level 0 may be called the root level of the processing relationship structure. Only one node appears at level 0. Node 250 at level 0 represents the root level of the FSO processing relationship structure. All other nodes in the structure are beneath node 250. Nodes beneath a node may be called descendents of the node. At level 1, one or more nodes may appear. In this example, an issuer node 252 and an acquirer node 254 are shown.

In the processing relationship structure, some nodes may represent physical entities in the FSO, and others may represent functional areas. A physical entity is an organizational unit that has a physical presence or manifestation, such as a bank branch office, regional office, or credit card line. A node representing a functional area is used organize one or more other nodes into a sub-processing relationship group in the FSO processing relationship based upon some function of the FSO. Examples of functional areas include issuer, acquirer, and non-risk. The issuer function may be described as the function of issuing credit cards or other credit instruments to customers of the FSO. The acquirer function may be described as the function of acquiring payments from users of credit cards and other credit instruments on behalf of the FSO and client organizations of the FSO. Non-risk is a functional area that may be used to group nodes dealing with non-risk (or very low risk) instruments such as some types of bonds and secured loans.

Three nodes are shown as descendents of issuer node 252 at level 2. One of the three nodes is Company B 256. Note that Company B is also represented by a node underneath acquirer node 254. In a processing relationship, an entity may appear below more than one functional area. An entity may have more than one function, and the functions of an entity may be represented by separate nodes in the processing relationship.

Company B node 256 has two descendents at level 3, Non-risk node 260 and Bank node 258. A node in the processing relationship tree may represent an object in the processing relationship, such as a bank. During the configuration, a node may be given multiple instances of the object. For example, bank node 258 may represent banks in general at level 3 under Company B. When configured, multiple banks may be created as instances of bank node 258. For example, First Street Bank, Main Street Bank, and Elm Street Bank may be added to the processing relationship structure as instances of Bank node 258. In this example, the three banks report to Company B, but not to each other.

Non-risk node 260 has one descendent at level 4, Bank 262. Bank 262 has one descendent at level 5, Branch 264.

FIGS. 6 and 7—Various Embodiments of Configuring a Processing Relationship Structure Using Various Interactive Computer Display Screens Generated by a Processing Relationship Configuration Program FIGS. 6–7 describe embodiments of configuring the processing relationship structure, described in FIG. 5f, using various interactive computer display screens generated by a processing relationship configuration program.

FIG. 6—One Embodiment of an Interactive Computer Display Screen for Configuring Processing Relationships, with Five Levels of Objects Displayed FIG. 6 illustrates one embodiment of a screen 150 for the user configuration of processing relationships using a processing relationship configuration program in an FSO system. This example shows a processing relationship structure, such as that illustrated in FIG. 5, that has been fully defined. All descendents of a first node in the processing relationship structure may appear directly beneath the node; after the descendents of the first node, a second node on the same level may appear, and then the second node's dependents, and so on. One or more columns may be indented to represent the processing relationship structure's levels. In this example, the description fields are indented to represent the levels.

FIG. 7—One Embodiment of an Interactive Computer Display Screen for Creating Instances of a First Object in a Processing Relationships Structure FIG. 7 illustrates one embodiment of a screen 170 for the user configuration of instances of nodes, or processing relationship objects, using a processing relationship configuration program in an FSO system. Screen 170 may be invoked by selecting one of the rows in screen 150 shown in FIG. 6 and selecting an "expand node" function choice from screen 150. Screen 170 may include one or more function choices (not shown). For example, screen 170 may include insert row, delete row, and edit row function choices. Function choices may be selectable in a variety of methods, including standard GUI methods such as buttons, menus, text boxes, and mouse highlighting and selection. Screen 170 may include one or more rows, with each row displaying one instance of a node in the processing relationships structure, and one or more columns, with each column displaying one node identifier. The data in the rows and columns may be modifiable by a user of the system. New rows may be inserted in screen 170 by selecting an insertion point and selecting an insert function choice from screen 170. In this example, two rows have been inserted.

Each instance of a node in the functional relationship structure may be assigned a node identifier. The node identifier may be unique among other instances of the node. In the processing relationship structure displayed in FIG. 6, the user may select the ISSUER node (row 1, level 1) and assign it a node identifier of 10. The user may then select the COMPANYA node (row 2, level 2) and assign it a node identifier of 1. The user may then select the REGION node (row 3, level 3) and assign it a node identifier of 10.

The user may then select the BRANCH node (row 4, level 4) and select the "expand node" function choice from screen 150. Screen 170 may be displayed, with ISS column 172, COA column 174, RGN column 176, BRN column 178, and NODE NUMBER column 179. Initially, no rows may be displayed, as no instances of the selected node may have been created. A row may be inserted in screen 170 by selecting an insertion point and selecting an "insert" function choice from screen 170. The node identifiers for the nodes may then be entered by the user. In one embodiment, one or more of the node identifiers may be automatically filled in by the process relationship configuration program upon inserting a new row. The processing relationship configuration program may then assign a unique node number (not to be confused with the node identifier) to the newly created node instance, and display the node number in NODE NUMBER column 179. In one embodiment, the user may not change the node numbers.

The combination of node identifiers assigned to an instance of a node uniquely locate the node instance in the processing relationship structure. The node number may be used as an abbreviation for the combination of node identifiers. In the example illustrated in FIG. 7, two node instances are displayed. The first is defined by node identifier combination (ISS=10, COA=1, RGN=10, BRN=100), and is assigned the node number 4. The second is defined by node identifier combination (ISS=10, COA=1, RGN=10, BRN=200), and is assigned the node number 5.

FIG. 8—An Example of One Embodiment of a Computer Model of the a Multilevel Business Processing Relationship Illustrated in FIG. 5f, Wherein Values Have Been Assigned to the Objects in the Processing Relationship FIG. 8 illustrates one embodiment of a computer model of the multilevel processing relationship structure illustrated in FIG. 5f, showing the node identifiers assigned by a user, and the node numbers assigned by the processing relationship configuration program, to the nodes and node instances. In FIG. 8, the user has created instances of all the nodes, and assigned node identifiers to all of the nodes. All node instances have been assigned unique node numbers. Node 250, the root level node is the only node on level zero and has been assigned a node number of 0. In one embodiment, the root level node may serve only as the root level node for the rest of the nodes in the processing relationship structure, and may not have an instance created. In one embodiment, nodes on level one may be specified as subsystem nodes. One instance of issuer node 252 at level one has been created and assigned a node identifier of 10 by the user, and a node number of 1 by the processing relationship configuration program. One instance of acquirer node 254 at level one has been created and assigned a node identifier of 20 by the user and a node number of 14 by the processing relationship configuration program.

In one embodiment, nodes at level two may be specified as Company nodes. At level two, under Issuer node instance 252, one instance of Company B node 256 has been created and assigned a node identifier of 2 by the user and a node number of 6 by the processing relationship configuration program. Also at level two, under Acquirer node instance 254, one instance of Company B node 270 has been created and assigned a node identifier of 2 by the user and a node number of 18 by the processing relationship configuration program. Node instances 256 and 270 illustrate that one entity in an organization may occur as multiple node instances in a processing relationship structure if the entity performs multiple functions in the processing relationship structure and therefore appears under multiple function node instances.

In one embodiment, nodes at levels three and lower may be specified as owner nodes, with a number attached to the owner tag indicating the level, with owner 1 at level three, owner 2 at level four, etc. At level three, one instance of Non-risk node 260 has been created and assigned a node identifier of 20 by the user and a node number of 7 by the processing relationship configuration program. Also at level three, one instance of Bank node 258 has been created and assigned a node identifier of 30 by the user and a node number of 10 by the processing relationship configuration program. At level four, one instance of Bank node 262 has been created and assigned a node identifier of 399 by the user and a node number of 8 by the processing relationship configuration program. At level five, one instance of Branch node 264 has been created and assigned a node identifier of 500 by the user and a node number of 9 by the processing relationship configuration program.

Branch node instances 266A and 266B illustrate the creation of multiple instances of a node by a user. Branch node instance 266A has been assigned a node identifier of 700 by the user and a node number of 20 by the processing relationship configuration program. Branch node instance 266B has been assigned a node identifier of 700 by the user and a node number of 20 by the processing relationship configuration program. Accounts in an FSO system may be associated with node instances in the processing relationship structure. In one embodiment, an account may be associated with only one node instance. Node instance information may be stored in the account master files, and also may be attached to transactions, files, database records, database tables, and other FSO data objects associated with the accounts. In some embodiments, an account master file or other FSO data object associated with the account may include the entire node identifier permutation that uniquely identifies the node in the tree. In some embodiments, an account master file or other FSO data object associated with the account may include the node number that uniquely identifies the node instance associated with the account.

In FIG. 8, examples of account types include customer accounts 265, which are accounts for individuals who do business with the FSO, and merchant accounts 267, which are accounts for merchant businesses who do business with the FSO. In one embodiment, accounts may be associated with node instances at any level of the processing relationship structure. In some embodiments, accounts may not be associated with node instances at one or more levels of the processing relationship structure.

In one embodiment, a database table in the FSO system may be used to store the node identifier permutations and node numbers for all of the node instances in a processing relationship structure. The database table may be used in the FSO system as a lookup table to convert between node numbers and node identifier permutations. The node number may serve in the FSO system as an abbreviation of the node identifier permutation, and allows the node instance associated with an account to be identified in FSO data objects using a minimum of space. The node identifier permutation may be used in user interfaces, output files, etc. to identify node instances to the user, as this may be the form a user is most likely to recognize and understand.

A processing relationship node number data element may be used as a break key field in report record definitions. The report record definition may be used for gathering report records, sorting the report records, and generating reports from the report records. Since a node number uniquely identifies a node instance in the processing relationship structure, and one or more of the node identifier(s) that are associated with the node number may be changed without changing the node number, report record definitions do not have to be modified when one or more node identifier(s) in the processing relationship structure are changed.

FIGS. 9–13 Illustrate Various Embodiments to Configure a Report Record Definition and to use the Report Record Definition and the Processing Relationship Structure to Rather and Format Reports FIG. 9 further illustrates an embodiment of a display screen to configure break keys in a report record definition. FIGS. 10a–10c include flow charts illustrating various Fu embodiments of a method of configuring report record definition using the processing relationship structure. FIGS. 11a–11e and 12 illustrate one embodiment of a structure of a report record definition. FIGS. 13a–13b include flow charts illustrating embodiments of a method to gather and format reports based on the configured report record definition.

FIG. 9—One Embodiment of an Interactive Computer Display Screen for Specifying Data Elements to be used as Break Keys in a Report Record Definition FIG. 9 illustrates one embodiment of a screen for specifying data elements to be used as break keys in a report record definiton. In one embodiment, screen 130 may be presented to a user of a report record definition program in response to the user selecting a report record definition from a plurality of report record definitions. In one embodiment, the screen 130 may be a graphical user interface (GUI). In another embodiment, the screen 130 may be a textual interface. Screen 130 may include one or more function choices (not shown). For example, screen 130 may include insert new break point, delete break point, and edit break point function choices. Function choices may be selectable in a variety of methods, including standard GUI methods such as buttons, menus, text boxes, and mouse highlighting and selection. Screen 130 may include multiple rows, with each row displaying one break point in the report record definition, and multiple columns, with each column displaying one property of the report record definitions displayed in the rows. The data in the rows and columns may be modifiable by a user of the system.

Columns in screen 130 may include a sequence column 132, a break level column 134, an element ID column 136, an abbreviation column 138, and a description column 139. Sequence column 132 may display a sequence number for the rows in screen 130. The sequence numbers may signify the order the break key values will appear in a report record. Break level column 134 may be used to specify an order in which the break keys will be evaluated during sorting of the report records and collating of the reports. Entering a special character, or entering no character (leaving the field blank), in break level column 134 for a break key may specify that the break key is to not be used in the sorting and collating of report records. Element ID column 136 may be used to display an alphanumeric database identifier for the data element that is being used as a break key. Abbreviation column 139 may be used to display a short label for the data element that is being used as a break key. Description column 162 may be used to display a textual description of the data element that is being used as a break key.

In one embodiment, a user may add additional break keys to a report record definition by selecting one or more data elements from among a plurality of data elements available to be used as break keys in report records in the FSO system. The user may then use screen 130 to specify the break order of one or more break keys in the report record definition by specifying a break level in field 134 for each break key. Field 134 may be left blank, or a special character may be entered, in one or more break keys to specify that the one or more break keys are not to be used to sort report records or collate reports.

In FIG. 9, screen 130 displays two break keys. The first break key (SEQ=1) is a Processing Relationship Node Number, and has been assigned a break level of 1. Account-related data may have a Processing Relationship Node Number data element. In one embodiment, during data gathering, the data gathering process may extract the Processing Relationship Node Number value from the account-related data from which report records are being gathered and write the Processing Relationship Node Number value to the report records. Thus, each report record may be associated with a unique account in the processing relationship structure using the Processing Relationship Node Number value. In one embodiment, the data gathering process may use the Processing Relationship Node Number value to look up an "expanded" processing relationship node identifier permutation in a look-up table, wherein the lookup table includes one column of node numbers and one or more columns of node identifiers that uniquely identify node instances in the processing relationship structure. The node identifier(s) located in the lookup table may then be written to the report record.

The second break key (SEQ=2) is an Account Type data element, and has been assigned a break level of 2. The second break key illustrates that data elements other than processing relationship node numbers and node identifiers may be used as break keys for reports.

The break level associated with a break key may be stored in the report record definition, along with other information about the data element to be used as the break key. In the example above, Processing Relationship Node Number is used as a break key, and is assigned a break level of 1. Account Type is also used as a break key, and is assigned a break level of 2. In this example, 1 is a higher priority break order than 2, meaning that, in sorting and collating, a break key with a break order of 1 is more significant than a break key with a break order of 2. In this example, when Processing Relationship Node Number is expanded into a processing relationship node identifier permutation, the report records may be sorted or collated on the node identifiers first, and then on the Account Type, because Processing Relationship Node Number has a higher priority break order than Account Type.

FIGS. 10a–10c—Flow Charts for Various Embodiments of a Method of Configuring Report Record Definition using the Processing Relationship Structure FIGS. 10a–10c include flow charts illustrating various embodiments of a method of configuring report record definition using the processing relationship structure. FIGS. 11a–11e and 12 illustrate one embodiment of a structure of a report record definition. FIGS. 13a–13b include flow charts illustrating embodiments of a method to gather and format reports based on the configured report record definition.

FIG. 10a—A High-Level Flow Chart Illustrating one Embodiment of a Method of Configuring Processing Relationships for use in Configuring Reports in an FSO System FIG. 10a is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. In step 400, the processing relationship configuration program is used by a user of the FSO system to configure the processing relationship structure and the nodes and node instances therein. In step 402, the user may add one or more node instances to report record definitions, which may then be used to extract, sort, and collate reports based upon the processing relationship structure. FIGS. 10b–10c expand on the flowchart illustrated in FIG. 10a.

FIG. 10b—A Mid-Level Flow Chart Illustrating one Embodiment of a Method of Configuring Processing Relationships for use in Configuring Reports in an FSO System FIG. 10b is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. FIG. 10b expands on the flowchart illustrated in FIG. 10a; steps 400 and 402 have been expanded into several steps.

In step 404, one or more-persons may first define the business structure of the FSO to be modeled in a processing relationship structure. After the business structure has been defined, a processing relationship structure may be configured using the processing relationship configuration program. In step 406, a user may define the processing relationship objects, or nodes, at each level of the processing relationship structure. The process of defining the nodes at each level of the structure, and of defining descendents of the nodes at the next level, in effect creates the processing relationship structure. In step 408, the user may then select processing relationship nodes in the processing relationship structure and create instances of the nodes by assigning node identifiers to the nodes. A node identifier may uniquely define a node instance within the processing relationship structure, and may define the relationship of the node instance with node instances above it in the processing relationship structure.

In step 410 and 412, report record definitions may be defined. A report record definition is a data structure that defines the format of report records in an FSO system. A report record may be defined as a data record including break key values and one or more data values. A report record may also include other data such as header data, sequencing information, time stamps, etc. Break key values in a report record may be used to sort the report records by one or more of the break key values, thus ordering the report records in a logical sequence by one or more of the break key fields. The break key values may then be used when generating a report to collate the report by one or more of the break key fields. When generating reports, a collection of data records, such as transaction log records, transaction records, account master files, etc., may be processed, with one or more report records extracted from the collection of data records using the report record definition for the report to be generated. In some embodiments, one report record may be generated for each data record processed.

In step 410, a user may add break keys to a report record definition. Break keys are fields in the report record definition that are used to extract data values from transaction records, account master files, or other data sources, and to assign the extracted data values to break key fields in a report record. The report record definition may also include one or more data field definitions, which may be used to extract data values from data elements in transaction records, account master files, or other data sources, and to assign the extracted data values to report data fields in a report record. The data field definitions may be added to the report record definition in step 412.

Processing relationship node identifiers may be used in report record definitions as break key fields. In one embodiment, node numbers may be used as an abbreviation for node identifiers in break key fields. A data record for which a report record is generated for a report may be associated with an account in the processing relationship structure. The data record may include a processing relationship node identifier and/or node number that may be used to link the data record to the account in the processing relationship structure. Using processing relationship node identifiers as break key fields in report record definitions may allow reports to be sorted and collated according to the processing relationship structure. This may allow individual reports to be automatically generated for business entities and FSO functional areas based upon the processing relationship structure. Rollup and summary reports may also be generated. As the report records including node instances are processed into reports, summary data may be compiled from the data fields within the report records. When a change, or break, in the key field values for the node instances is encountered, a summary report for all node instances at that level, for that branch of the processing relationship structure, may be generated. A report may continue this process for the entire processing relationship structure, thus generating summary reports for the entire FSO processing relationship as defined in the structure.

FIG. 10c—A Detailed Flow Chart Illustrating one Embodiment of a Method of Configuring Break Keys in Report Record Definitions in an FSO System FIG. 10c is a flowchart illustrating one embodiment of a method of configuring break keys in a report record definition using the report record definition program. FIG. 10c is an expansion of step 410 from the flowchart illustrated in FIG. 10b. In step 432, a user of the report record definition program may select processing relationships to be available for use as break key(s) in the report. In one embodiment, Processing Relationship Node Number may appear as a data element in a plurality of data elements in the FSO system database. The user may select the Processing Relationship Node Number data element from a list of the plurality of data elements and add it to a list of data elements available for use as break keys in the report record definition. In step 434, a user of the report record definition program may select one or more other data elements to be available for use as break key(s) in the report. The user may select the data elements from the list of the plurality of data elements and add it to the list of data elements available for use as break keys in the report record definition.

In step 436, the user may select processing relationships to be used as break keys in a report record definition. In one embodiment, a Processing Relationship Node Number data element may appear as a break key in a list of break keys available for use in the report record definition. The user may select the Processing Relationship Node Number break key and specify a break level for the break key to enable the break key for use in sorting and collating report records. In step 438, the user may select other data elements to be used as break keys in a report record definition. In one embodiment, the data elements may appear as break keys in a list of break keys available for use in the report record definition. The user may select the data elements to be used as break keys in step 438, and specify a break level for the break keys to enable the break keys for use in sorting and collating report records. In some embodiments, the break keys to be used in a report record definition may be first selected in steps 436 and 438, and the break order for the selected break keys may be specified in step 440. For example, a display of the break keys may include a "select for break key" field and a "break level" field. The user may enter a character in the "select for break key" field to select the break record in step 436 or 438, and then enter a break level for all of the selected break keys to specify the break order in step 440.

Figure 12:
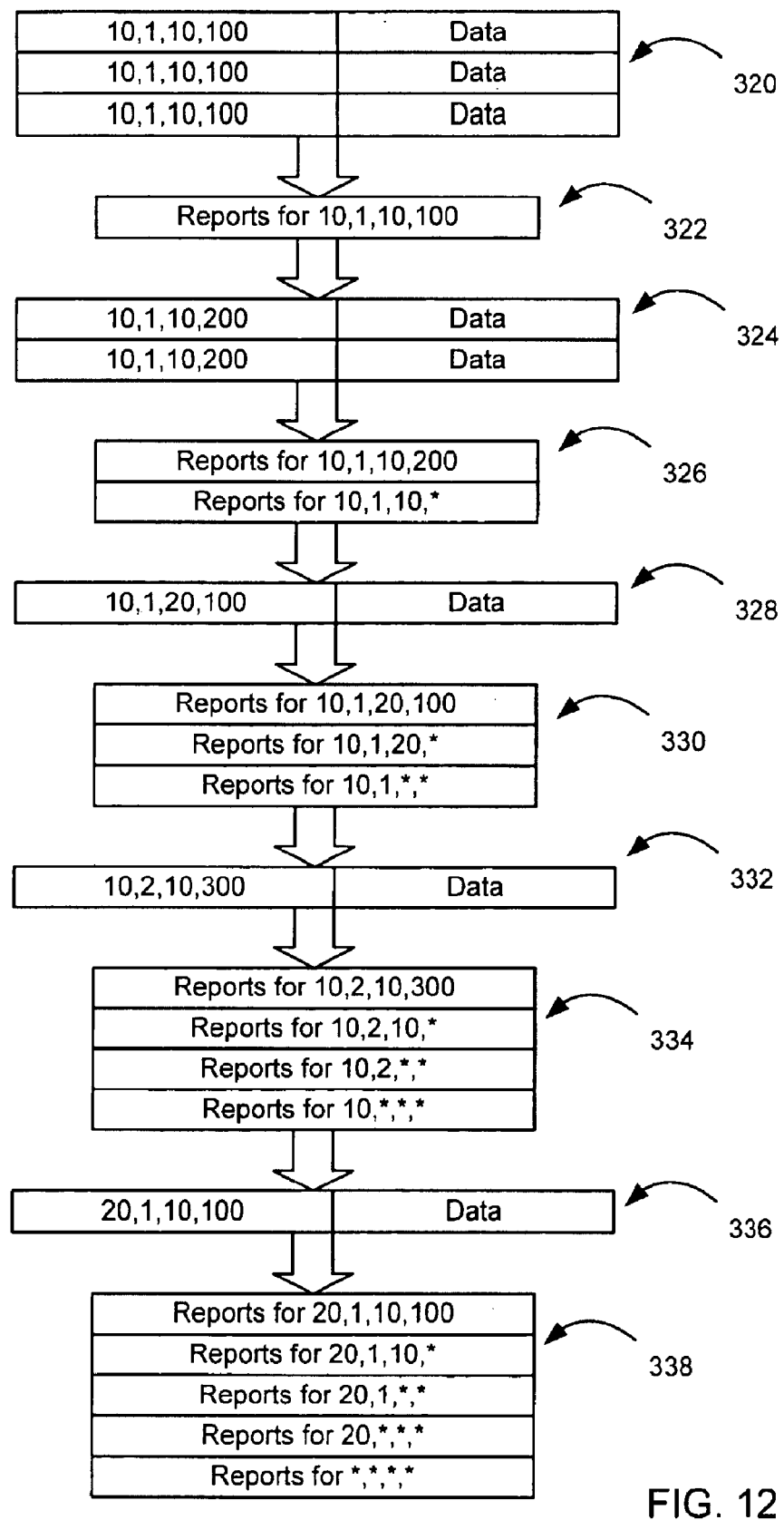
FIG. 12 is a data flow diagram illustrating one embodiment of generating reports using processing relationship break keys.
Figure 13A:
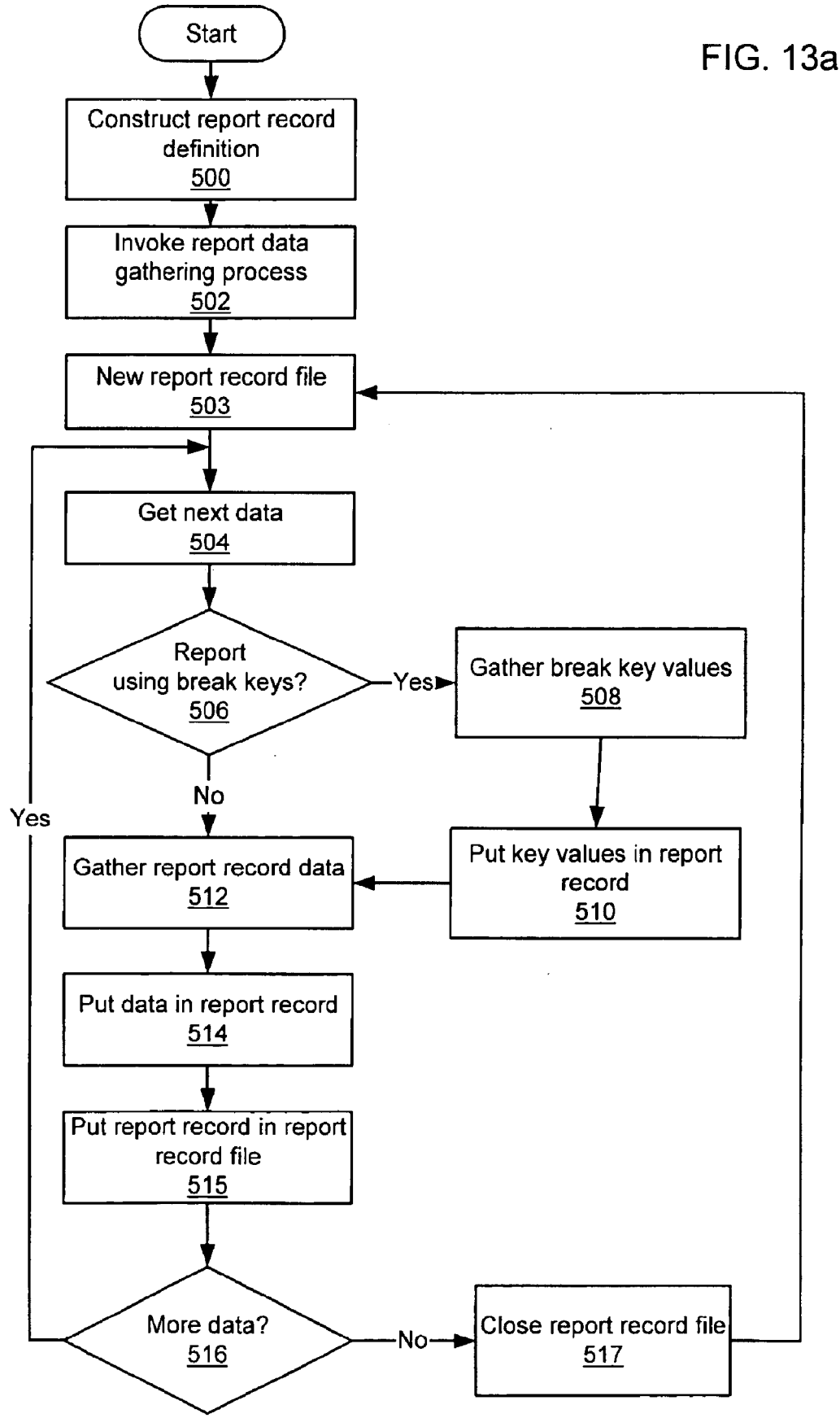
FIG. 13a is a flowchart illustrating one embodiment of a method of report data gathering using user-configured break keys.
Figure 13B:
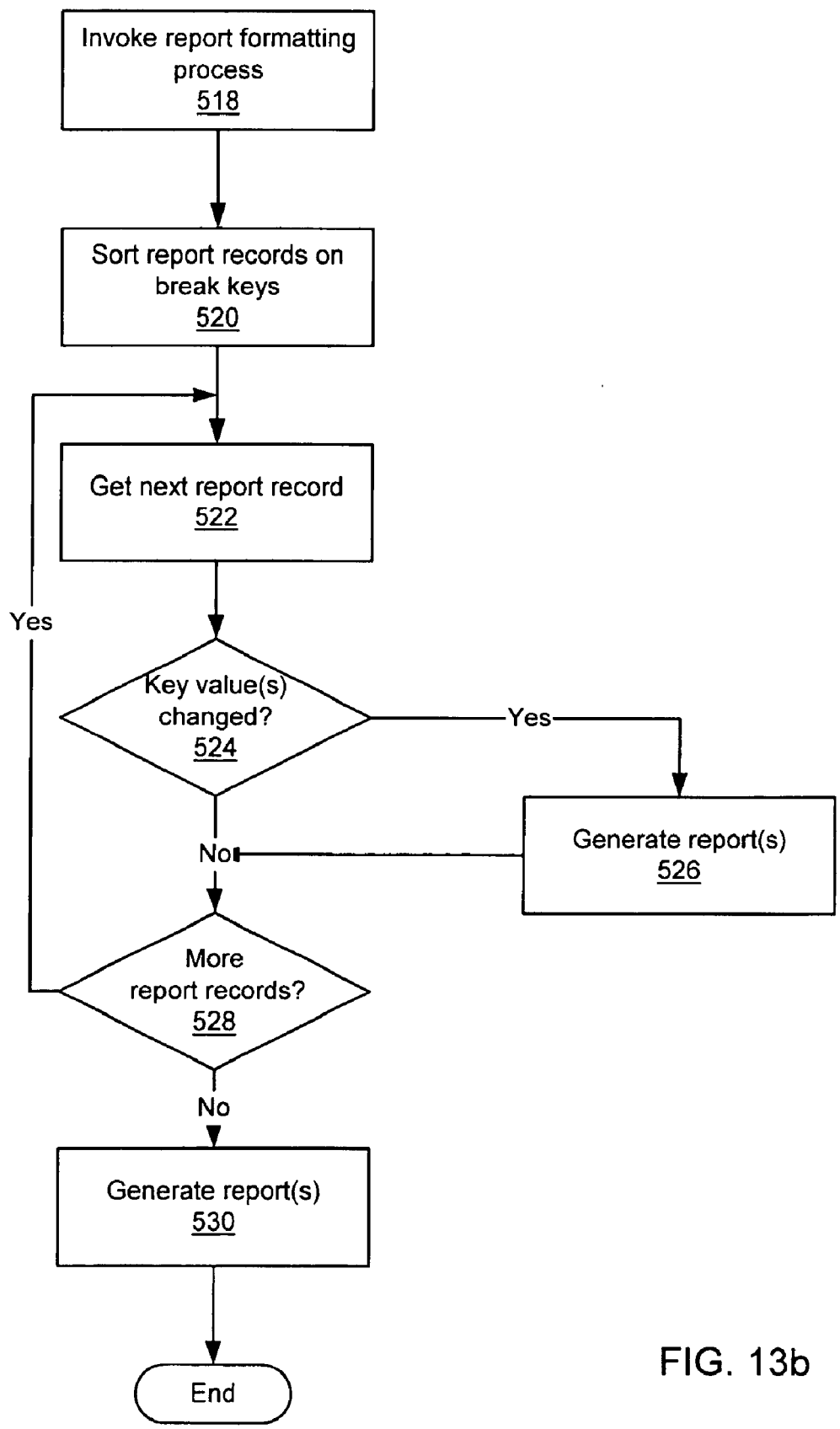
FIG. 13b is a flowchart illustrating one embodiment of a method of report sorting and collating using user-configured break keys.

FIGS. 11*a*–11*e*—An Embodiment of a Structure of a Report Record Definition FIGS. 11*a*–11*e* and 12 illustrate one embodiment of a structure of a report record definition. FIG. 12 illustrates one embodiment of generating a report using break keys. FIGS. 13*a*–13*b* include flow charts illustrating embodiments of a method to gather and format reports based on the configured report record definition.

FIGS. 11*a*—A Feneral Format of one Embodiment of a Report Record Definition FIG. 11*a* illustrates the general format for one embodiment of a report record definition. A report record definition may include several groups of fields. Field group 300 may include one or more data elements to be used as break keys in report records. Field group 302 may include one or more data elements to be used as report data in report records. In one embodiment, the FSO system may be capable of outputting a plurality of reports. In one embodiment, each of the plurality of reports may have one or more report record definitions for extracting break key data values and report data values from account-specific data and storing the data values in report records. In one embodiment, the FSO system may include a database including report record definitions that is accessible processes that create, manipulate, and read the report records, such as the data generation process, the sort process, and the report generation process. Thus, the report record definitions may be external to the processes that use them, making it unnecessary for the report record definitions to be hardcoded in the source code of the processes. The external report record definitions may make it possible for users of the FSO system to configure the report record definitions without going through the process of modifying source code, recompiling executable programs, and re-installing the software applications that may utilize report record definitions.

FIG. 11*b*—An Example of one Embodiment of a Report Record Definition

FIG. 11*b* illustrates an example of one embodiment of a report record definition. In FIG. 11*b*, one data element, the processing relationship node number 304, has been added as a break key in the report record definition.

A data element may appear in a report record definition both as a break key and as a report data element. For example, an FSO may wish to sort and collate report records on data element A, and to display the value of data element A in a report.

FIG. 11*c*—A Format of one Embodiment of a Report Record Definition Showing the use of Processing Relationship Nodes as Break Keys FIG. 11*c* illustrates the format of a report record that may be constructed using the report record definition illustrated in FIG. 11*b*. The report record may include a header 310 that may include data fields to be used in storing, sorting, and producing collated reports on the report records. Break key field 312 illustrates that processing relationship node number used as a break key may result in an expanded set of processing relationship node identifiers being written to the report records. In one embodiment, the FSO system may include a lookup table for converting processing relationship node numbers into permutations of processing relationship node identifiers, as illustrated further in FIG. 14. As account-specific data are processed by the data gathering process, the data gathering process may read a processing relationship node number value from the account-specific data set, look up the processing relationship node identifiers for the node number value in the lookup table, and write the node identifiers to the report record to be used as break key values for sorting and collating report records. In one embodiment, the set of node identifiers may be arranged in a sort order. In one embodiment, the higher the node identifier in the processing relationship structure, the more significant the node identifier is in the sort order. Data area 314 may include one or more data element values extracted from the account-specific data set using the report record definition. The data element values may be used in one or more fields on a report.

FIG. 11*d*—An Example of an Unsorted Set of Report Records Constructed Using the Report Record Definition Illustrated in FIG. 11*b*

FIG. 11*d* illustrates an example of an unsorted set of report records constructed using the report record definition of FIG. 11*b*. The report records are specific examples of the general format illustrated in FIG. 11*c*. In one embodiment, the report records may be constructed by a data gathering process and written to a report record file. In one embodiment, the data gathering process may read the report record definition from an external source, such as a database including report records. Break key fields 312 are set to specific values of processing relationship node identifiers in each of the report records. Report records that have been generated from account-specific data belonging to the same account have identical break key field values. In one embodiment, report records may be appended to the bottom of the report record file as they are generated. In this embodiment, the report records may appear in the file in chronological order. In one embodiment, the header 310 may include a time stamp for the report record.

FIGS. 11*e*—The Example Set of Report Records Constructed Using the Report Record Definition Illustrated in FIG. 11*b* After Sorting on the Processing Relationship Break Keys FIG. 11*e* shows the example set of report records illustrated in FIG. 11*d* after the records have been sorted by a sort process. In one embodiment, the sort process may use a report record definition, such as that shown in FIG. 11*b*, in the sorting of the records. In one embodiment, the sort process may read the report record definition from an external source, such as a database including report records. The records have been sorted by the break key fields. In this example, the break key fields are processing relationship node-identifiers shown in the report record format of FIG. 11*c*. The sort process may use the report record definition to generate a template of the report record format to determine which break keys to sort on, what the sort order of the break keys is, etc. In FIG. 11*d*, the leftmost node identifier, representing the highest node instance in the processing relationship structure used for report break key purposes, being the most significant field in the sort. The rightmost node identifier is the least significant field in the sort. The rightmost node identifier is the node identifier of the node instance to which the account associated with the report record belongs. In one embodiment, the sort process may be integrated with the report generation process, so that the sorting of the report records in a report record file may occur during the report generation process.

An account may be associated with a node instance at one of several levels in a processing relationship structure, resulting in different numbers of node identifiers in one or more report records. For example, a first report record constructed using processing relationship node number as a break key may include three levels of node identifiers, while a second report record constructed using processing relationship node number as a break key may include four levels of node identifiers.

FIG. 12—A Data Flow Diagram Illustrating one Embodiment of Generating Reports Using Processing Relationship Break Keys FIG. 12 is a flow diagram illustrating one embodiment of generating reports using processing relationship break keys. In the example shown in FIG. 12, the sorted set of report records illustrated in FIG. 1e are input into the report generation process. The report generation process may read the records from a first record to the last, and may generate a report break when a change in one or more break keys is detected. In the example, four levels of processing relationship node identifiers are break keys. The node identifier values may have been written into the report records by the data gathering process that compiled the set of report records. The data gathering process may have read a processing relationship node number from the account-specific data set being processed and used the node number to look up a corresponding set of node identifiers in a lookup table.

The report generation process may use the report record definition illustrated in FIG. 11b to construct a report record format such as that illustrated in FIG. 11c. The report generation process may use a report record definition such as that illustrated in FIG. 11b to construct a template report record format for reading and sorting the report records. In one embodiment, the report generation process may read the report record definition from an external source, such as a database including report records.

The report generation process may read the report records from the sorted set of report records from a first record to a last record. The report generation process may read the first report record and format the report data values read from the report record into a report. In one embodiment, the report may be a report on all of the report records for accounts associated to a particular node instance in the processing relationship structure. The node instance for which the report is being generated may be uniquely identified by one or more node identifier values. The report records being processed into the report may include node identifier values as break key values.

The report generation process may add one or more report data values to accumulators for later using the accumulated values in summary reports. In one embodiment, the report generation process may write one line in the report for each report record processed. When the report generation process reads the second report record, it may compare the one or more break key values in the second report record to the first report record's break key values. If the break key values are the same, the report generation process may process the second report record into the same report and accumulators that the first report record was processed into. If one or more of the break keys have changed, a report break is generated.

Upon generating a report break, the report generation process may perform one or more report formatting tasks. Examples of report formatting tasks include, but are not limited to: generating summary reports, starting new reports, inserting line breaks, inserting page breaks, and inserting headers. The formatting task performed may depend upon which break key(s) changed to generate the report break. If more than one break key changed, the report generation process may perform report formatting tasks for each of the changed break keys. In one embodiment, the formatting tasks to be performed upon report breaks generated by the break keys in a report record definition may be stored in a report format file.

In this example, the report generation process may read the first three report records 320 from the inputted sorted set of report records and add them to a first report. In the fourth report record (the first in report record set 324) one of the break key values has changed, so a report break is generated. The report generation process may generate reports 322. Since in this example the break keys are processing relationship node identifiers, the reports may include account detail and summary reports for the node instance identified by the unique node identifier permutation (10,1,10,100).

The report generation process may then read the next two report records 324 from the inputted sorted set of report records and add them to a second report. In the sixth report record (the first in report record set 328) two of the break key values have changed, so two report breaks may be generated. The report generation process may generate reports 326. Since in this example the break keys are processing relationship node identifiers, the reports may include account detail and summary reports for the node instance identified by the unique node identifier permutation (10,1,10,200). Since a break key with a higher significance has changed (Own1 from the report record format illustrated in FIG. 11c), the reports may also include account detail and summary reports for all node instance identified by the node identifier permutation (10,1,10,*), where the "*" is a wildcard value. In this example, the wildcard value identifies node identifier permutation (10,1,10,100) and node identifier permutation (10,1,10,200).

The report generation may continue the process of reading sets of report records, generating report breaks, and generating detail and summary reports for processing relationship node instances identified by unique node identifier permutations (when the least significant node identifier changes) and for groups of node instances identified by node identifier permutations with wildcards in one or more fields (when one or more of the more significant node identifiers change). Upon reading the last record 336, one or more report breaks may be generated. Since in this example the break keys are processing relationship node identifiers, the reports may include account detail and summary reports for the node instance identified by the unique node identifier permutation (20,1,10,100). Since record 336 is the last report record in the input report record set, the report generation program may behave like all of the break keys have changed, and generate report breaks for all of the break keys. Thus, the reports may include account detail and summary reports for all node instance identified by the node identifier permutations (20,1,10,*), (20,1,*,*), (20,*,*,*), and (*,*,*,*), where the "*" is a wildcard value. The last node identifier permutation, (*,*,*,*), may generate reports covering all of the node instances in the processing relationship structure.

Thus, an FSO may use processing relationships as break keys to automatically generate detail and summary reports for the accounts in each of the entities and functions described as node instances in a processing relationship structure. "Rollup" and summary reports may be generated for an entity or function described as a node instance in the processing relationship structure that has one or more node instances "beneath" it on the branch of the processing relationship structure. The summary reports may include summaries of the accounts associated with the node instances beneath the entity or function in the processing relationship structure. For instance, a bank A may have a branch B and a branch C beneath it in a processing relationship structure. Account detail reports may be generated for branch. B and branch C, then a branch account summary report may be generated for bank A that summarizes account data from branch B and branch C.

Data elements other than processing relationships may be used as break keys in report record definitions. The sorting and collating of reports using data elements other than processing relationships as break keys may be performed identically to the sorting and collating of reports using processing relationships as break keys. The only difference may be that the break key values may be read directly from the input data source, rather than being read as a node number and translated into a unique node identifier permutation. Some report record definitions may include processing relationships as break keys and other data elements as break keys.

FIGS. 13a–13c—Embodiments of Report Gathering and Generation Using Break Keys.

FIGS. 13a–13c illustrate various embodiments of gathering data used in reports, processing of the gathered data and the generation of reports using break keys.

FIGS. 13a—A Flowchart Illustrating one Embodiment of a Method of Report Data Gathering Using User-Configured Break Keys FIG. 13a is a flowchart illustrating one embodiment of a method of report data gathering using user-configured break keys. In step 500, a user may configure a report record definition. Configuring the report record definition may include adding one or more data elements to the report record definition to be used as break keys, specifying a break order for the one or more break keys, and adding one or more data elements to the report record definition to be used as report data elements. The report record definition may be stored in the FSO system database for later retrieval by one or more processes that may create, manipulate, and generate reports from report records using the report record definition. In one embodiment, a user may configure the report record definitions during a configuration of the FSO computer system. In one embodiment, report record definitions may be configured by users of the FSO computer system during runtime.

In step 502, a report data gathering process may be invoked. In one embodiment of an FSO system, a report data gathering process may run continuously as long as the system is operable. The report data gathering process may generate a report record for each account transaction that occurs in the FSO system. In one embodiment, a report data gathering process may be invoked on a scheduled basis to periodically gather data from account data files. In one embodiment, a user may invoke a report data gathering process, for example, to generate reports on customer account master files in the FSO system. In step 503, the data gathering process may create and open a new report record file for receiving report records generated in the data gathering process.

Steps 504 through 516 may be repeated until the report gathering process is terminated, or until a break occurs in the process, such as an end-of-day break, that may cause the data gathering process to close the current report record file and open a new report record file. In step 504, the data gathering process may become aware of a new data set from which a report record is to be generated. In one embodiment, the data set may be an account-specific data set. In one embodiment, the data set may be an FSO business product transaction generated for a particular customer, client, or merchant account in the FSO system.

In step 506, the data gathering process may check the report record definition generated in step 500 to see if it includes break keys. In one embodiment, the report record definition may have been stored in a database in step 500, and the data gathering process may read the report record definition from the database. If the report record definition does not include break keys, the data gathering process may proceed to step 512. If the report record definition does include break keys, the data gathering process may proceed to step 508. In step 508, the data gathering process may use the break keys defined in the report record definition to locate and extract the data element values to be used as break key values from the data set being processed. In step 510, the break key values may be written to the report record for the data set being processed. The data gathering process may then proceed to step 512. In step 512, the data gathering process may use the report data elements defined in the report record definition to locate and extract the data element values to be used as report data values from the data set being processed. In step 514, the report data values may be written to the report record for the data set being processed. In step 516, if more report records are to be gathered, the process returns to step 504. If the report record file is ready for report generation, the data gathering process may close the report in step 517.

FIG. 13b—a Flowchart Illustrating One Embodiment of a Method of Report Sorting and Collating Using User-Configured Break Keys FIG. 13b is a flowchart illustrating one embodiment of a method of report sorting and collating using user-configured break keys. The method illustrated in FIG. 13b may be performed on report record files generated using the method illustrated in FIG. 13a. In step 518 of FIG. 13b, the report generating process may be invoked. The report generation process may be invoked in a variety of ways. For example, a batch process may be set up to invoke the report generation process on a set schedule, such as once a day at 2 p.m. or Saturday at midnight. The report generation process may be invoked to run immediately on a selected report record file by a user. A user may invoke a batch process to run once at a future time and invoke the report generation process. Events in the FSO system may also invoke the report generation process; for example, an error condition may trigger the report generation process to report on data in logfiles for error recovery validation purposes.

In step 520, the report records in a report record file may be sorted on one or more break keys defined in a report record definition. In one embodiment, the report record definition may be stored in a database, and the sort process may read the report record definition from the database. The sorted report records may be written back into the report file (sort in place) or may be written to a new report file.

In steps 522 through 528, the report records in the sorted report record file are processed and collated into one or more reports. The report records may be collated on one or more break keys defined in a report record definition. In one embodiment, the report record definition may be stored in a database, and the collate process may read the report record definition from the database. In step 522, a next report record may be read from the report record file. One or more report data values in the report record may be written to a report, and one or more of the report data values may be added to accumulators. In step 524, the break key values in the report record may be compared to the break key values of a previous report record. If one or more break key values have changed on or more report breaks may be generated, and one or more reports may be generated in step 526. Refer to the description of FIG. 12 for details on the generation of report breaks and the generation of reports based on the report breaks.

Referring again to FIG. 13b, the report collating process may check to see if there are more report records in the report record file being processed. If there are, processing may return to step 522 to get the next record. If there are no more records, a report break may be generated and processing may proceed to step 530. In step 530, one or more reports may be generated. In one embodiment, if one of the break keys in the report record definition is a processing relationship node number, then a summary report covering all of the report records for all of the node instances in the processing relationship structure may be generated.

Figure 14:
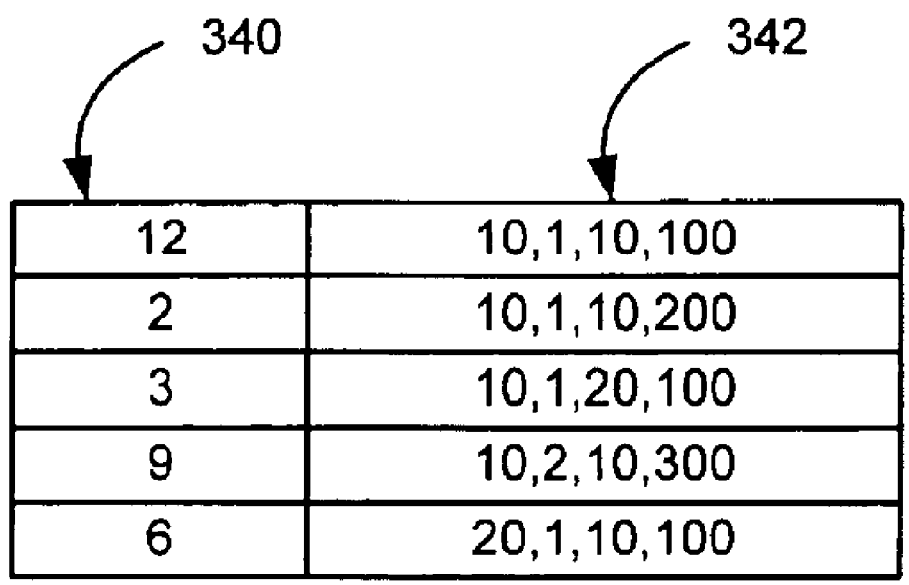
FIG. 14 is an embodiment of a database table in the FSO system that may be used to store node identifier permutations and node numbers.

FIG. 14—an Embodiment of a Database Table in the FSO System that May be Used to Store Node Identifier Permutations and Node Numbers FIG. 14 illustrates an embodiment of a database table in the FSO system that may be used to store the node identifier permutations 342 and node numbers 340 for all of the node instances in a processing relationship structure. FIG. 14 uses the node identifier permutations previously used in FIGS. 11*d* and 11*e* as examples. The database table may be used in the FSO system as a lookup table to convert between node numbers 340 and node identifier permutations 342. The node number 340 may serve in the FSO system as an abbreviation of the node identifier permutation 342, and allows the node instance associated with an account to be identified in FSO data objects using a minimum of space. The node identifier permutation may be used in user interfaces, output files, etc. to identify node instances to the user, as this may be the form a user is most likely to recognize and understand.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method performed in a financial service organization (FSO) computer system, wherein an FSO comprises a plurality of FSO entities, wherein each of the FSO entities performs one or more transactions, wherein each transaction comprises data, wherein the FSO computer system comprises a model of the FSO stored in a database, the model: comprising the FSO entities configured in a tree structure, wherein the tree structure comprises one or more branches, wherein each of the tree branches comprises one or more FSO entities of the FSO entities, and wherein at least one of the FSO entities on at least one of the tree branches reports to a first one of the FSO entities higher on the tree branch, the method comprising:

a) accessing a transaction from a database of a plurality of transactions;

b) reading a processing relationship object associated with the accessed transaction from a database, wherein the processing relationship object describes a location of one or more processing parameter values for the accessed transaction;

c) reading one or more processing parameter values associated with the transaction described in the processing relationship object;

d) transferring the one or more processing parameter values to a report record;

e) reading a report data definition from the database of a plurality of transactions from a), wherein the report data definition describes a location of data in the accessed transaction;

f) transferring the data to the report;

repeating a) through f) until each of the plurality of transactions has been accessed and the associated processing parameters placed in a report record, wherein one report record is created for each transaction, and wherein each of the report records are stored in a report record file;

sorting report records such that report records comprising FSO identifying processing parameter values of the one or more FSO entities below other FSO entities on the tree branch appear in the sorted report record file before report records associated with FSO entities that are higher on the tree branch;

g) identifying a current report record and reading the current report record from the sorted report record file;

h) identifying the FSO associated with the current report record, wherein the identified FSO is designated as the current FSO entity;

i) writing data from the current report record to a summary report for the current FSO entity;

j) reading a next report record of the sorted report record;

k) comparing the FSO entity associated with the next report record to the current FSO entity;

l) writing data from the next report record to a summary report for the current FSO entity if the FSO entity of the next report is the same as the current FSO entity;

m) creating a new summary report in response to the FSO entity of the next report record not being equal to the current FSO entity; and writing data from the current report record to a summary report for the FSO entity associated with the next report record;

n) designating the FSO entity associated with the next report record as the current FSO entity;

repeating g) through n) until all of the report records in the report record file have been read.

2. The method of claim 1, wherein the database comprises a report record definition, the report record definition comprising the processing relationship object and the report data definition.

3. The method of claim 1, wherein the processing relationship and the configuration of the FSO tree structure are defined by a user of the FSO computer system during configuration of the FSO computer system.

4. The method of claim 1, wherein at least one of the processing parameter values comprises a break key value and wherein the break key value is configured by a user of the FSO computer system.

5. The method of claim, wherein at least one of the processing parameter values is defined by a user of the FSO computer system.

6. The method of claim 1, wherein at least one of the processing parameter values comprises a break key value, and wherein the break key is hardcoded.

7. The method of claim 1, wherein at least one of the processing parameter values comprises a sequence number, wherein the sequence number identifies the order of appearance of at least one data element of the data in the FSO entity report.

8. The method of claim 1, wherein the one or more processing parameter values comprises one or more sequence numbers and a break level number.

9. The method of claim 1, wherein at least one of the processing parameter values comprises a database identifier, wherein the database identifier identifies at least one FSO of the FSO entities.

10. The method of claim 1, wherein creating a report record file comprises one or more users of the FSO system executing one or more report programs.

11. The method of claim 1, wherein the report record further comprises a report format, the report format comprising a definition for a report page layout, wherein the report page layout identifies a location for at least one data element of the data on a report page.

12. The method of claim 1, wherein sorting the report records comprises writing the sorted report records to a new report record file.

13. The method of claim 1, wherein sorting the report records comprises writing the sorted report records to the report record file.

14. The method of claim 1, wherein the method further comprises formatting the report records before sorting the report records.

15. A system for processing financial service organization (FSO) transactions, the system comprising:
- a computer system, wherein the FSO comprises a plurality of FSO entities, wherein each of the FSO entities performs one or more transactions, wherein each transaction comprises data, wherein the FSO computer system comprises a model of the FSO stored in a database, the model comprising the FSO entities configured in a tree structure, wherein the tree structure comprises one or more branches, wherein each of the tree branches comprises one or more FSO entities of the FSO entities, and wherein at least one of the FSO entities on at least one of the tree branches reports to a first one of the FSO entities higher on the tree branch;
- a computer program, wherein the computer program is executable on the computer system to execute:
- a) accessing a transaction from a database of a plurality of transactions;
- b) reading a processing relationship object associated with the accessed transaction from a database, wherein the processing relationship object describes a location of one or more processing parameter values for the accessed transaction;
- c) reading one or more processing parameter values associated with the transaction described in the processing relationship object;
- d) transferring the one or more processing parameter values to a report record;
- e) reading a report data definition from the database of a plurality of transactions from a), wherein the report data definition describes a location of data in the accessed transaction;
- f) transferring the data to the report record;
- repeating a) through f) until each of the plurality of transactions has been accessed and the associated processing parameters placed in a report record, wherein one report record is created for each transaction, and wherein each of the report records are stored in a report record file;
- sorting report records such that report records comprising FSO identifying processing parameter values of the one or more FSO entities below other FSO entities on the tree branch appear in the sorted report record file before report records associated with FSO entities that are higher on the tree branch;
- g) identifying a current report record and reading the current report record from the sorted report record file;
- h) identifying the FSO associated with the current report record, wherein the identified FSO is designated as the current FSO entity;
- i) writing data from the current report record to a summary report for the current FSO entity;
- j) reading a next report record of the sorted report record;
- k) comparing the FSO entity associated with the next report record to the current FSO entity;
- l) writing data from the next report record to a summary report for the current FSO entity if the FSO entity of the next report is the same as the current FSO entity;
- m) creating a new summary report in response to the FSO entity of the next report record not being equal to the current FSO entity; and writing data from the current report record to a summary report for the FSO entity associated with the next report record;
- n) designating the FSO entity associated with the next report record as the current FSO entity;
- repeating g) through n) until all of the report records in the report record file have been read.

16. The system of claim 15, wherein the database comprises a report record definition comprising the processing relationship object and the report data definition.

17. The system of claim 15, wherein the processing relationship and the configuration of the FSO tree structure are defined by a user of the FSO computer system during configuration of the FSO computer system.

18. The system of claim 15, wherein at least one of the processing parameter values comprises a break key value, and wherein the break key value is configured by a user of the FSO computer system.

19. The system of claim 15, wherein at least one of the processing parameter values is defined by a user of the FSO computer system.

20. The system of claim 15, wherein at least one of the processing parameter values is a break key value, and wherein the break key value is hardcoded.

21. The system of claim 15, wherein at least one of the processing parameter values comprises a sequence number, wherein the sequence numbers identifies the order of appearance of at least one data element of the data in the FSO entity report.

22. The system of claim 15, wherein the one or more processing parameter values comprises a sequence number and a break level number.

23. The system of claim 15, wherein at least one of the processing parameter values comprises a database identifier, wherein the database identifier identifies at least one FSO entity of the FSO entities.

24. The system of claim 15, wherein creating a report record file comprises one or more users of the FSO computer system executing one or more report programs.

25. The system of claim 15, wherein the report record further comprises a report format; the report format comprising a definition for a report page layout, wherein the report page layout identifies a location for at least one data element of the data on a report page.

26. The system of claim 15, wherein sorting the report records comprises writing the sorted report records to a new report record file.

27. The system of claim 15, wherein sorting the report records comprises writing the sorted report records to the report record file.

28. The system of claim 15, wherein the method further comprises formatting the report records before sorting the report records.

29. A recordable medium comprising program instructions for a financial system organization (FSO), wherein a model of the FSO stored in a database, the model comprising the FSO entities configured in a tree structure, wherein the tree structure comprises one or more branches, wherein each tree branch comprises one or more FSO entities of the FSO entities, wherein the at least one of the FSO entities on at least one of the tree branches reports to a first one of the FSO entities higher on the tree branch, and wherein the FSO entities perform one or more transactions, wherein each of the transactions comprise data and wherein the program instructions are executable by the FSO computer system to implement:

- a) accessing a transaction from a database of a plurality of transactions;
- b) reading a processing relationship object associated with the accessed transaction from a database, wherein the processing relationship object describes a location of one or more processing parameter values for the accessed transaction;
- c) reading one or more processing parameter values associated with the transaction described in the processing relationship object;
- d) transferring the one or more processing parameter values to a report record;
- e) reading a report data definition from the database of a plurality of transactions from a), wherein the report data definition describes a location of data in the accessed transaction;
- f) transferring the data to the report record;
- repeating a) through f) until each of the plurality of transactions has been accessed and the associated processing parameters placed in a report record, wherein one report record is created for each transaction, and wherein each of the report records are stored in a report record file;
- sorting report records such that report records comprising FSO identifying processing parameter values of the one or more FSO entities below other FSO entities on the tree branch appear in the sorted report record file before report records associated with FSO entities that are higher on the tree branch;
- g) identifying a current report record and reading the current report record from the sorted report record file;
- h) identifying the FSO associated with the current report record, wherein the identified FSO is designated as the current FSO entity;
- i) writing data from the current report record to a summary report for the current FSO entity;
- j) reading a next report record of the sorted report record;
- k) comparing the FSO entity associated with the next report record to the current FSO entity;
- l) writing data from the next report record to a summary report for the current FSO entity if the FSO entity of the next report is the same as the current FSO entity;
- m) creating a new summary report in response to the FSO entity of the next report record not being equal to the current FSO entity, and writing data from the current report record to a summary report for the FSO entity associated with the next report record,
- n) designating the FSO entity associated with the next report record as the current FSO entity;
- repeating g) through n) until all of the report records in the report record file have been read.

30. The carrier medium of claim 29, wherein the database comprises a report record definition, the report record definition comprising the processing relationship object and the report data definition.

31. The carrier medium of claim 29, wherein the processing relationship and the configuration of the FSO tree structure are defined by a user of the FSO computer system during configuration of the FSO computer system.

32. The carrier medium of claim 29, wherein at least one of the processing parameter values comprises a break key value, and wherein the break key is hardcoded.

33. The carrier medium of claim 29, wherein at least one of the processing parameter values comprises a sequence number, wherein the sequence number identifies the order of appearance of at least one data element of the data in the FSO entity report.

34. The carrier medium of claim 29, wherein at least one of the processing parameter values comprises a database identifier, wherein the database identifier identifies at least one of the FSO entities.

35. The carrier medium of claim 29, wherein creating a report record file comprises one or more users of the FSO computer system executing one or more report programs.

36. The carrier medium of claim 29, wherein the report record further comprises a report format; the report format comprising a definition for a report page layout, wherein the report page layout identifies a location for at least one data element of the data on a report page.

37. The carrier medium of claim 29, wherein sorting the report records comprises writing the sorted report records to a new report record file.

38. The carrier medium of claim 29, wherein sorting the report records comprises writing the sorted report records to the report record file.

39. The carrier medium of claim 29, wherein the method further comprises formatting the report records before sorting the report records.

* * * * *